(12) United States Patent
Maruyama et al.

(10) Patent No.: US 12,285,896 B2
(45) Date of Patent: Apr. 29, 2025

(54) INJECTION MOLDING DEVICE

(71) Applicant: SEIKO EPSON CORPORATION, Tokyo (JP)

(72) Inventors: Hidenobu Maruyama, Nagano (JP); Kenta Anegawa, Nagano (JP); Kazuyuki Harayama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 162 days.

(21) Appl. No.: 18/358,058

(22) Filed: Jul. 25, 2023

(65) Prior Publication Data
US 2024/0033985 A1 Feb. 1, 2024

(30) Foreign Application Priority Data

Jul. 27, 2022 (JP) .................. 2022-119298

(51) Int. Cl.
*B29C 45/76* (2006.01)
*B29C 45/17* (2006.01)
(Continued)

(52) U.S. Cl.
CPC .......... *B29C 45/84* (2013.01); *B29C 45/1742* (2013.01); *B29C 45/401* (2013.01); *B29C 45/47* (2013.01); *B29C 45/60* (2013.01); *B29C 45/66* (2013.01); *B29C 45/7626* (2013.01); *B29C 45/7653* (2013.01); *B29C 45/7666* (2013.01); *B29C 2045/664* (2013.01);
(Continued)

(58) Field of Classification Search
CPC . B29C 45/84; B29C 45/7653; B29C 45/7666; B29C 45/60; B29C 45/1742; B29C 45/66; B29C 45/768; B29C 45/0416; B29C 45/7626; B29C 45/47; B29C 45/464; B29C 45/401; B29C 45/664; B29C 45/33; B29C 2945/76709; B29C 2945/76665; B29C 2945/76725; B29C 2945/76163; B29C 2945/76525

See application file for complete search history.

(56) References Cited

U.S. PATENT DOCUMENTS 5,513,115 A * 4/1996 Richards ................. B29C 45/76
264/40.5
2008/0053188 A1* 3/2008 Itoh ..................... B29C 45/7653
73/1.15

FOREIGN PATENT DOCUMENTS

EP 3 520 984 A1 8/2019
JP 2019-130834 A 8/2019

* cited by examiner

*Primary Examiner* — Thu Khanh T. Nguyen
(74) *Attorney, Agent, or Firm* — Global IP Counselors, LLP

(57) ABSTRACT

An injection molding device includes a housing having a door, an injection molding machine, a detection section, and a control section. The control section controls voltage applied to the mold clamping motor, and performs mold-clamping and mold-opening of the upper mold and the lower mold by either moving the injection unit and the upper mold along the vertical direction or by moving the lower mold along the vertical direction. The mold clamping device further includes a first brake section that, when application of voltage to the mold clamping motor is stopped, regulates movement of the injection unit and the upper mold in the vertical direction or movement of the lower mold in the vertical direction. When the detection section detects that the door is open or detects intrusion of foreign matter, the control section stops application of voltage to the mold clamping motor.

9 Claims, 17 Drawing Sheets

(51) Int. Cl.
*B29C 45/40* (2006.01)
*B29C 45/47* (2006.01)
*B29C 45/60* (2006.01)
*B29C 45/66* (2006.01)
*B29C 45/78* (2006.01)
*B29C 45/84* (2006.01)

(52) U.S. Cl.
CPC ............... *B29C 2945/76525* (2013.01); *B29C 2945/76665* (2013.01); *B29C 2945/76709* (2013.01); *B29C 2945/76725* (2013.01)

INJECTION MOLDING DEVICE

The present application is based on, and claims priority from JP Application Serial Number 2022-119298, filed Jul. 27, 2022, the disclosure of which is hereby incorporated by reference herein in its entirety.

BACKGROUND

1. Technical Field

The present disclosure relates to an injection molding device.

2. Related Art

JP-A-2019-130834 discloses an in-line screw-type injection molding machine having an upright-type mold clamping device.

An injection molding machine, including the upright-type mold clamping device, has a problem in that, for some reason, an upper mold or a lower mold may unintentionally move in the direction of gravity when a power supply to a mold clamping motor is stopped.

SUMMARY

According to a first aspect according to the present disclosure, there is provided an injection molding device. The injection molding device includes a housing having a door, an injection molding machine stored in the housing, a detection section configured to detect whether the door is open or closed or to detect intrusion of foreign matter into the housing, and a control section. The injection molding machine has a support section for supporting a die-casting mold having an upper mold and a lower mold, an injection unit configured to inject a molding material toward a cavity defined by the upper mold and the lower mold, and a mold clamping device having a mold clamping motor that drives the die-casting mold, the injection unit, the upper mold, and the lower mold are disposed in this order in a vertical direction from above, while in a supported state in which the die-casting mold is supported by the support section. In the supported state, the control section controls voltage applied to the mold clamping motor, and performs mold-clamping and mold-opening of the upper mold and the lower mold by either moving the injection unit and the upper mold along the vertical direction or by moving the lower mold along the vertical direction. The mold clamping device further includes a first brake section that, when application of voltage to the mold clamping motor is stopped, regulates movement of the injection unit and the upper mold in the vertical direction or movement of the lower mold in the vertical direction. When the detection section detects that the door is open or detects intrusion of foreign matter, the control section stops application of voltage to the mold clamping motor.

DESCRIPTION OF EMBODIMENTS

A. First Embodiment

Figure 1:
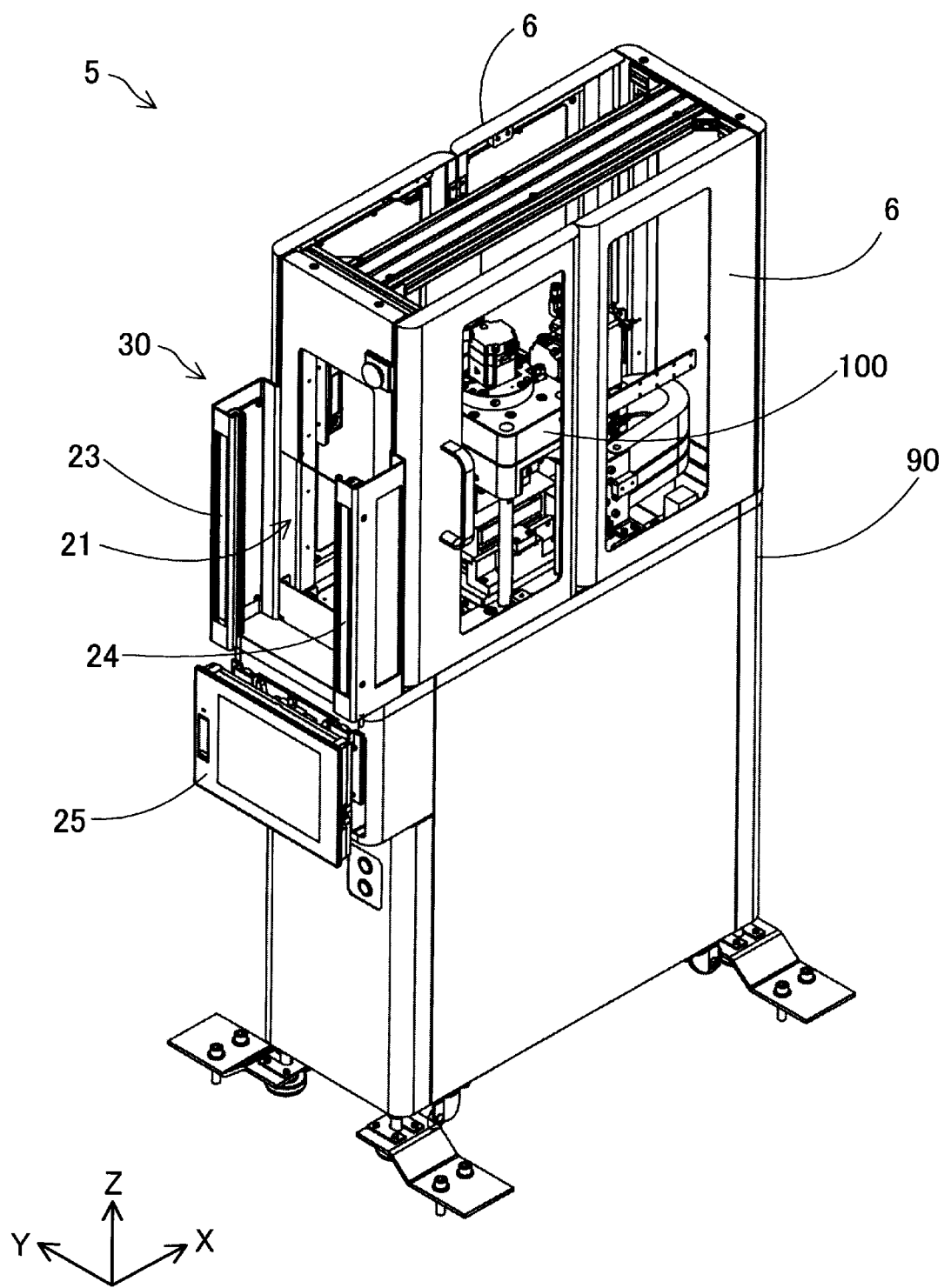
FIG. 1 is a perspective view of an injection molding device according to a first embodiment.
Figure 2:
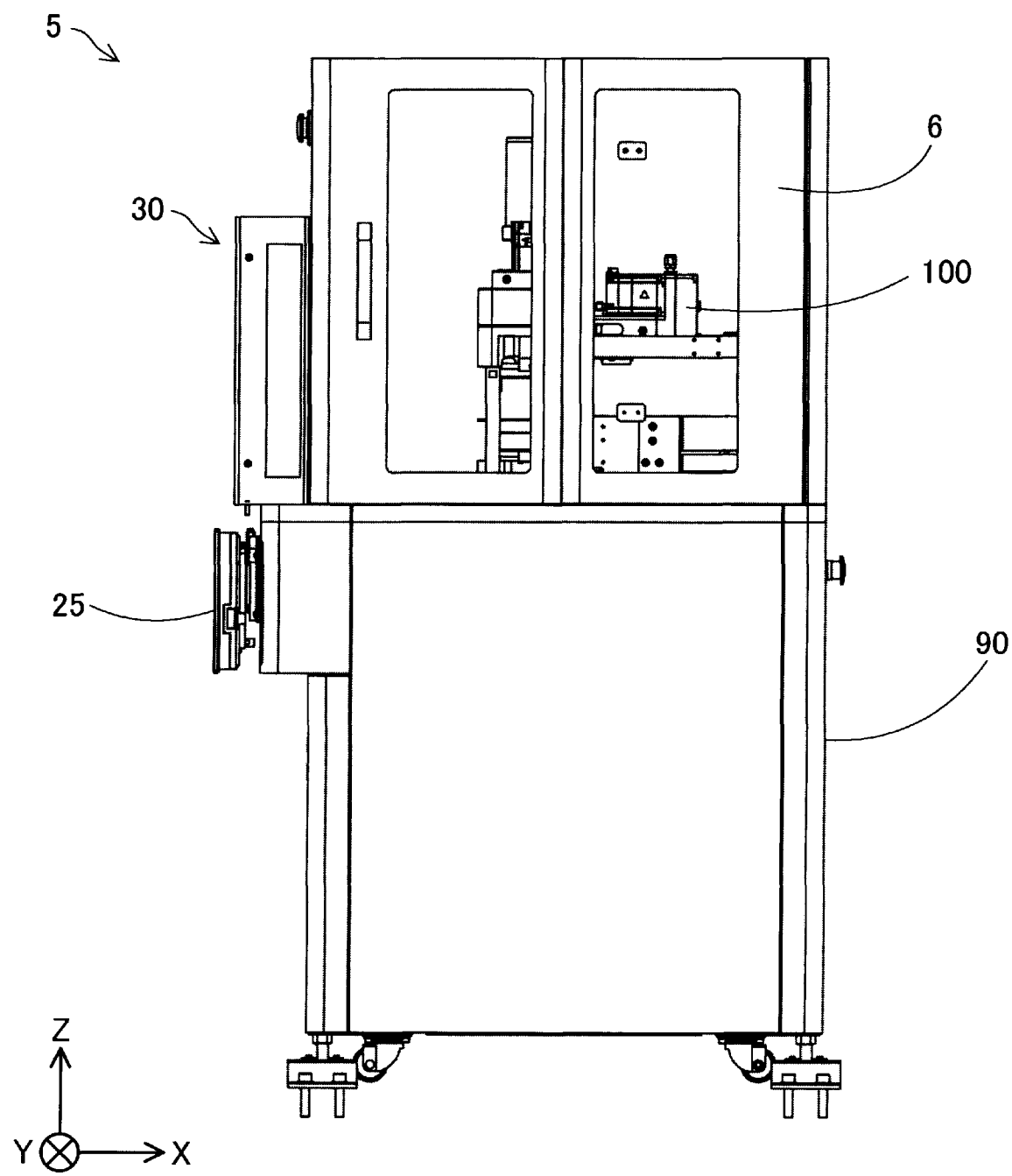
FIG. 2 is a right side view of the injection molding device.
Figure 3:
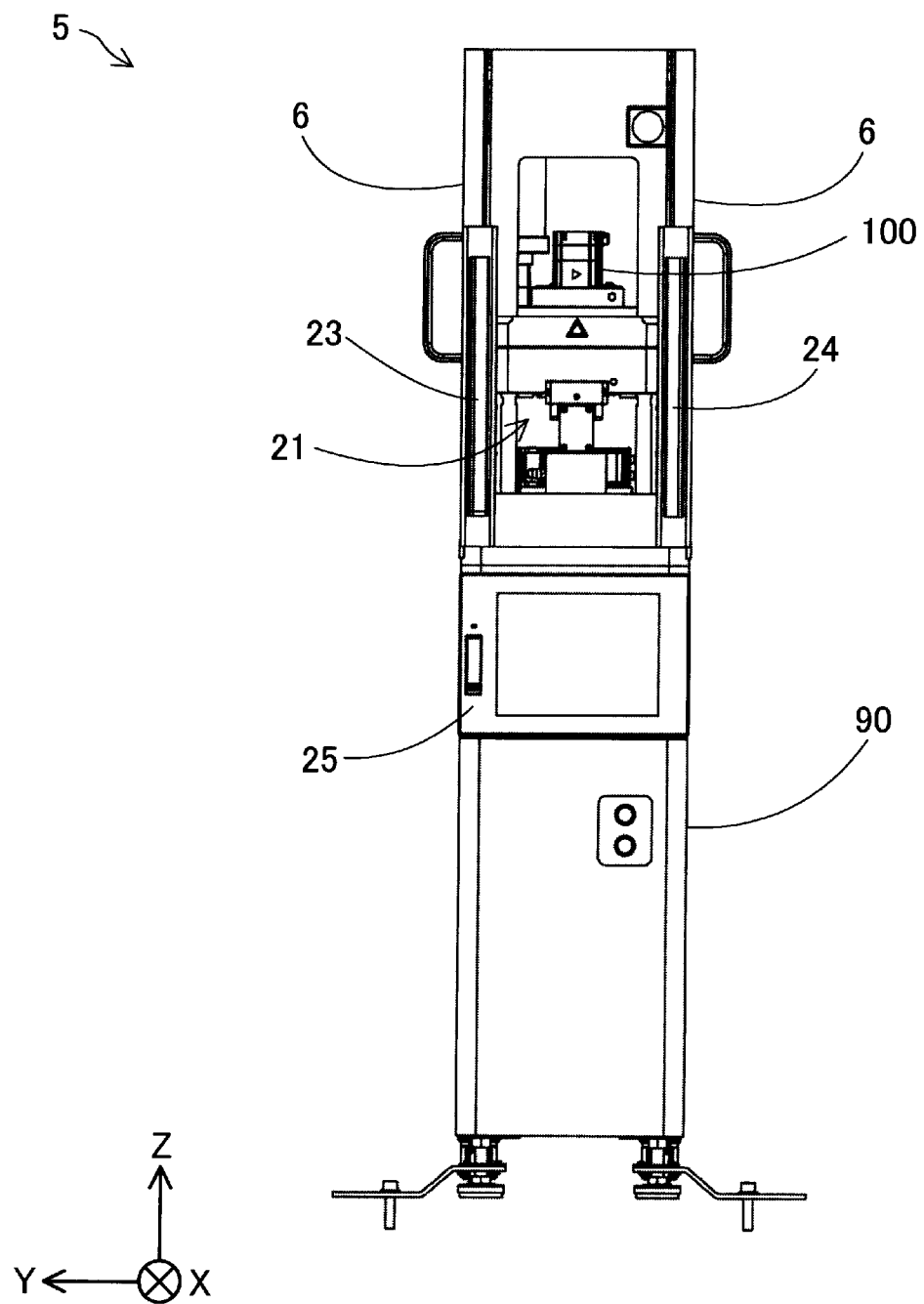
FIG. 3 is a front view of an injection molding device.
Figure 4:
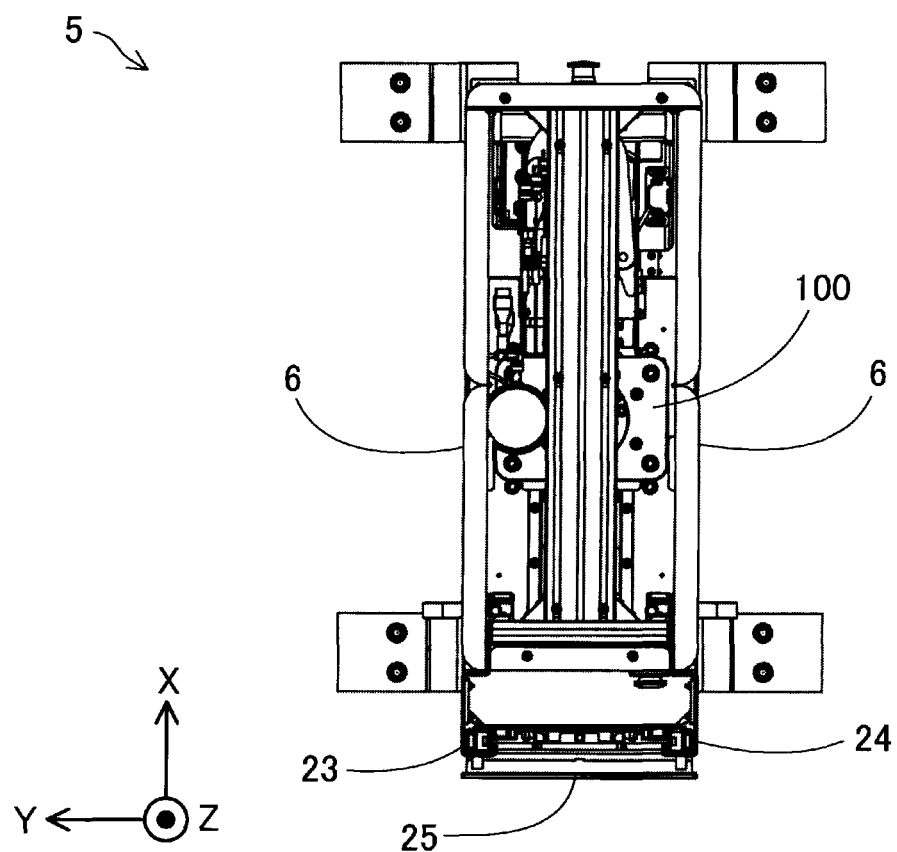
FIG. 4 is a plan view of the injection molding device.

FIG. 1 is a perspective view of an injection molding device 5 according to a first embodiment. FIG. 2 is a right side view of the injection molding device 5. FIG. 3 is a front view of the injection molding device 5. FIG. 4 is a plan view of the injection molding device 5. In these figures, arrows along X, Y, and Z directions orthogonal to each other are shown. The X, Y, and Z directions are directions along the X-axis, the Y-axis, and the Z-axis, which are three spatial axes orthogonal to each other, and each direction includes both the direction along one side of the X-axis, the Y-axis, and the Z-axis and the opposite side. The X-axis and the Y-axis are axes along a horizontal plane, and the Z-axis is an axis along a vertical line. The −Z direction is a vertical direction, and the +Z direction is a direction opposite to the vertical direction. The −Z direction is also referred to as "down", and the +Z direction is also referred to as "up". In the other figures, arrows along the X, Y, and Z directions are shown as appropriate. The X, Y, and Z directions in FIGS. 1 to 4 and the X, Y, and Z directions in other figures indicate the same direction.

The injection molding device 5 includes a housing 90 having a door 6, an injection molding machine 100 accommodated in the housing 90, an operation section 25, and a detection section 30. The operation section 25 receives various setting operations for the injection molding machine 100. The detection section 30 detects whether the door 6 is open or closed or detects the intrusion of foreign matter into the housing 90. An opening section 21 is provided on the front surface of the housing 90.

The detection section 30 includes a light emitting section 23 and a light receiving section 24 that are disposed so as to sandwich the opening section 21. Light is emitted from the light emitting section 23 toward the light receiving section 24. The detection section 30 determines that foreign matter has entered the opening section 21 when the light traveling from the light emitting section 23 toward the light receiving section 24 is blocked and the light receiving section 24 cannot receive the light. Alternatively, the detection section 30 may include a contact-type sensor to detect the open or closed state of the door 6. When the detection section 30 detects the intrusion of the foreign matter or detects that the door 6 is open, the injection molding device 5 stops operation of each section of the injection molding machine 100. In this way, it is possible to suppress the influence of the intrusion of foreign matter on the molding of the component or the like by the injection molding machine 100.

Figure 5:
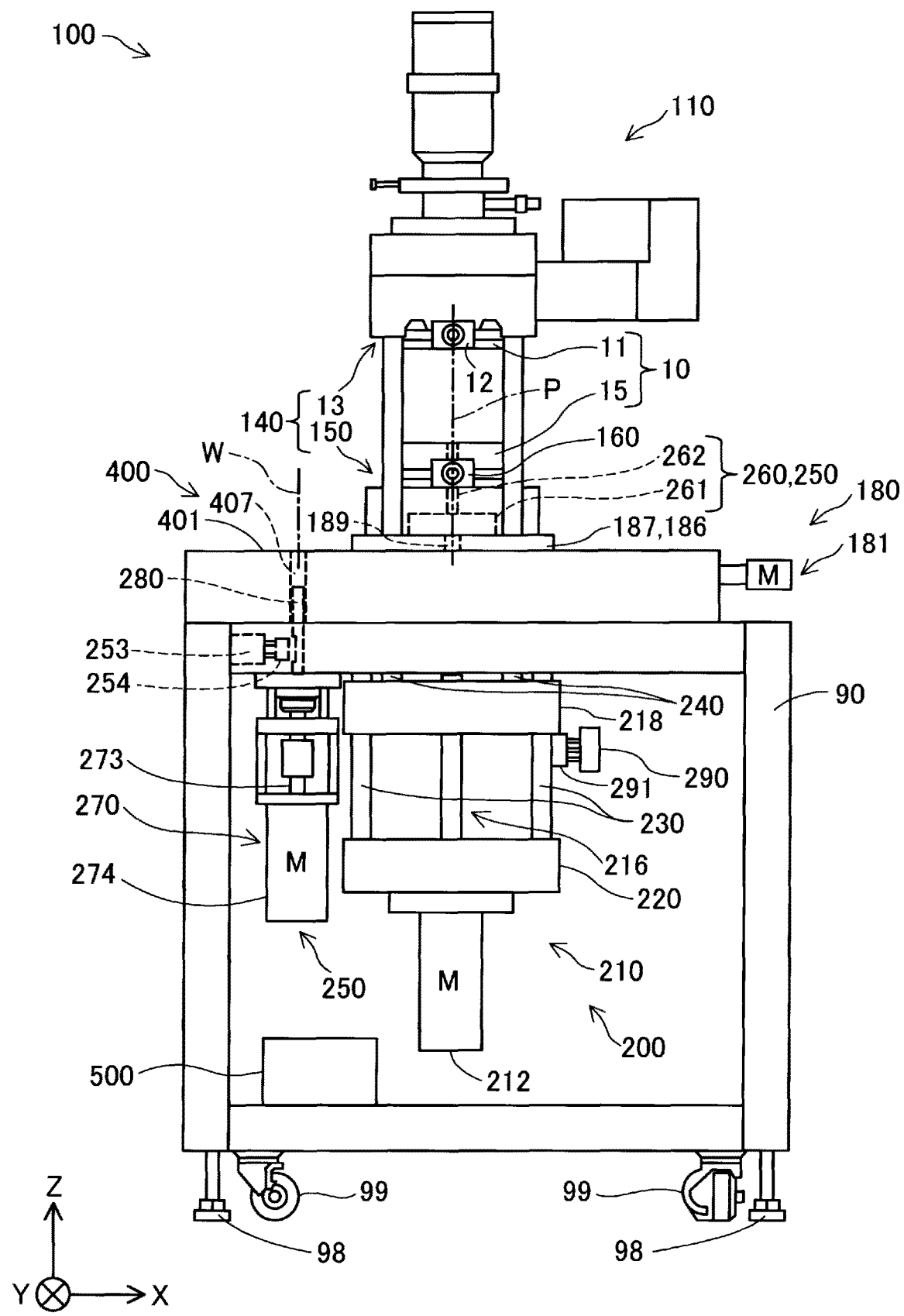
FIG. 5 is a first diagram illustrating schematic configuration of the injection molding machine according to the first embodiment.

FIG. 5 is a first diagram illustrating schematic configuration of the injection molding machine 100 according to the first embodiment. The injection molding machine 100 includes an injection unit 110, a support section 140, a position change section 180, a mold clamping device 200, an ejector section 250, a first auxiliary brake 290, a base 400, and a control section 500. The injection molding machine 100 is fixed to the base 400 fixed to the housing 90. The injection molding machine 100 is configured such that a die-casting mold 10 is installable therein. The injection molding machine 100 molds a molded article by injecting a molding material, which will be described later, from the injection unit 110 into the installed die-casting mold 10. The die-casting mold 10 may be made of metal, resin, or ceramic, for example. The die-casting mold 10 made of metal may be referred to as a metal mold.

The housing 90 includes wheels 99 at the corners of the bottom surface thereof. Therefore, the injection molding machine 100 is configured to be freely movable. In this embodiment, stoppers 98 are provided on the bottom surface of the housing 90 so as to be adjacent to the wheels 99. A user can fix the injection molding machine 100 to an installation place by using the stoppers 98.

The control section 500 is configured by a computer including one or more processors, a main storage device, and an input/output interface that performs input and output of signals with the outside. When the processor reads the program into the main memory and executes it, the control section 500 controls the injection unit 110 and the mold clamping device 200 to manufacture a molded article.

The detection section 30 shown in FIG. 1 is coupled to the control section 500. The control section 500 has a function of stopping application of voltage to a mold clamping motor 212, an ejector motor 274, and a screw motor 32, which will be described later, when the detection section 30 detects that the opening of the door 6 or detects the intrusion of foreign matter.

The die-casting mold 10 has an upper mold 11 and a lower mold 15. The upper mold 11 and the lower mold 15 define a cavity that is a space according to the shape of a molded article. More specifically, indentations and protrusions for partitioning the cavity are provided on the lower surface of the upper mold 11 and the top surface of the lower mold 15, and by clamping the upper mold 11 and the lower mold 15, a cavity having a shape corresponding to these indentations and protrusions is partitioned between the upper mold 11 and the lower mold 15.

The die-casting mold 10 is placed in the injection molding machine 100 by being supported by the support section 140 of the injection molding machine 100. In the present embodiment, the support section 140 refers to an upper mold support section 13 supporting the upper mold 11 and a lower mold support section 150 supporting the lower mold 15. The upper mold support section 13 is fixed to a lower portion of the injection unit 110 and is configured as a holder including an upper mold clamp 12 that clamps and fixes the upper mold 11 in the Y direction. The lower mold support section 150 is provided below the upper mold support section 13 and is configured as a holder having a lower mold clamp 160 for holding and fixing the lower mold 15 in the Y direction. In FIG. 5 and other figures described below, unless otherwise specified, the die-casting mold 10 is shown installed in the injection molding machine 100.

As shown in FIG. 5, in a state in which the die-casting mold 10 is supported by the support section 140, that is, in a state in which the upper mold 11 is supported by the upper mold support section 13 and the lower mold 15 is supported by the lower mold support section 150, the upper mold 11 is disposed below the injection unit 110, and the lower mold 15 is disposed below the upper mold 11. That is, in a state in which the die-casting mold 10 is supported by the support section 140, the injection unit 110, the upper mold 11, and the lower mold 15 are arranged in this order from the top in the vertical direction. In the present embodiment, both the upper mold 11 and the lower mold 15 are disposed above the base 400 in a state in which the die-casting mold 10 is supported by the support section 140. Hereinafter, a state in which the die-casting mold 10 is supported by the support section 140 is also referred to as a "supported state".

The mold clamping device 200 is configured to clamp or open the die-casting mold 10 by moving the injection unit 110 and the upper mold 11 along the Z direction in the supported state. The mold clamping device 200 includes a die-casting mold drive unit 210, a first brace section 230, and a second brace section 240. The die-casting mold drive unit 210 includes the mold clamping motor 212, a ball screw portion 216, a movable plate 218, and a fixed plate 220.

The first brace section 230 includes four support columns extending in the Z direction. An upper end portion of the first brace section 230 is fixed to the base 400, and a lower end portion thereof is fixed to the fixed plate 220 of the die-casting mold drive unit 210. That is, the base 400 and the fixed plate 220 are fixed to each other by the first brace section 230. In FIG. 5, only two columns arranged in the −Y direction among the four columns constituting the first brace section 230 are shown.

The fixed plate 220 has a flat plate shape. The fixed plate 220 is fixed to the lower end portion of the above-described first brace section 230 so that the plate surface thereof is parallel to the horizontal direction.

The mold clamping motor 212 in this embodiment is constituted by a motor with an electromagnetic brake. Using the electromagnetic brake, the mold clamping motor 212 regulates rotation of the motor shaft by generating a braking force in a state in which voltage is not applied to the excitation coil, and allows rotation of the motor shaft in a state in which a voltage is applied to the excitation coil. That is, the electromagnetic brake provided in the mold clamping motor 212 regulates rotation of the mold clamping motor 212 when no voltage is applied to the mold clamping motor 212. The electromagnetic brake provided in the mold clamping motor 212 is referred to as a first electromagnetic brake. The mold clamping motor 212 is disposed below the lower mold 15. More specifically, the mold clamping motor 212 is fixed to a lower portion of the fixed plate 220 fixed to a lower end portion of the first brace section 230, with an output shaft of the mold clamping motor facing upward. Drive of the mold clamping motor 212 is controlled by the control section 500. The output shaft of the mold clamping motor 212 passes through the fixed plate 220 and is coupled to the ball screw portion 216. The mold clamping motor 212 and the ball screw portion 216 may be coupled via a speed reducer.

The movable plate 218 has a flat plate shape. The movable plate 218 is coupled to the ball screw portion 216 so that its plate surface is parallel to the horizontal direction. The first brace section 230 passes through the movable plate 218 in the Z direction. The movable plate 218 moves in the Z direction with respect to the fixed plate 220 using the first brace section 230 as a guide in a state where the lower surface thereof faces the top surface of the fixed plate 220 by the rotation of the ball screw portion 216 driven by the mold clamping motor 212.

The second brace section 240 in the present embodiment is constituted by four columns extending in the Z direction. The second brace section 240 is provided so as to pass through the base 400 in the Z direction. A lower end portion of the second brace section 240 is fixed to the movable plate 218. The injection unit 110 with the upper mold 11 is fixed to an upper end portion of the second brace section 240. In FIG. 5, only two columns arranged in the −X direction among the four columns constituting the second brace section 240 are shown.

The first auxiliary brake 290 according to the present embodiment regulates the vertical movement of the injection unit 110 and the upper mold 11. The first auxiliary brake 290 is fixed to the housing 90 by a fixing device (not shown). The first auxiliary brake 290 includes an actuator 291 that can contact the lower surface of the movable plate 218 in the mold opening state. As the actuator 291, for example, an electric cylinder or an air cylinder can be used. The operation of the first auxiliary brake 290 is controlled by the control section 500.

In the present embodiment, when application of voltage to the mold clamping motor 212 is stopped, then as shown in FIG. 5, the first auxiliary brake 290 regulates the injection unit 110 in the mold open state supported by the movable plate 218 and downward movement of the upper mold 11 by the actuator 291 contacting the lower surface of the movable plate 218. The control section 500 stops application of voltage to the mold clamping motor 212 when, for example, the detection section 30 detects that the door 6 is open or detects the intrusion of foreign matter. Therefore, when the detection section 30 detects that the door 6 is open or detects the intrusion of foreign matter, the first auxiliary brake 290 assists the first electromagnetic brake provided in the mold clamping motor 212 and more reliably regulates downward movement of the injection unit 110 and the upper mold 11. The first electromagnetic brake and the first auxiliary brake 290 are referred to as a "first brake section".

Figure 6:
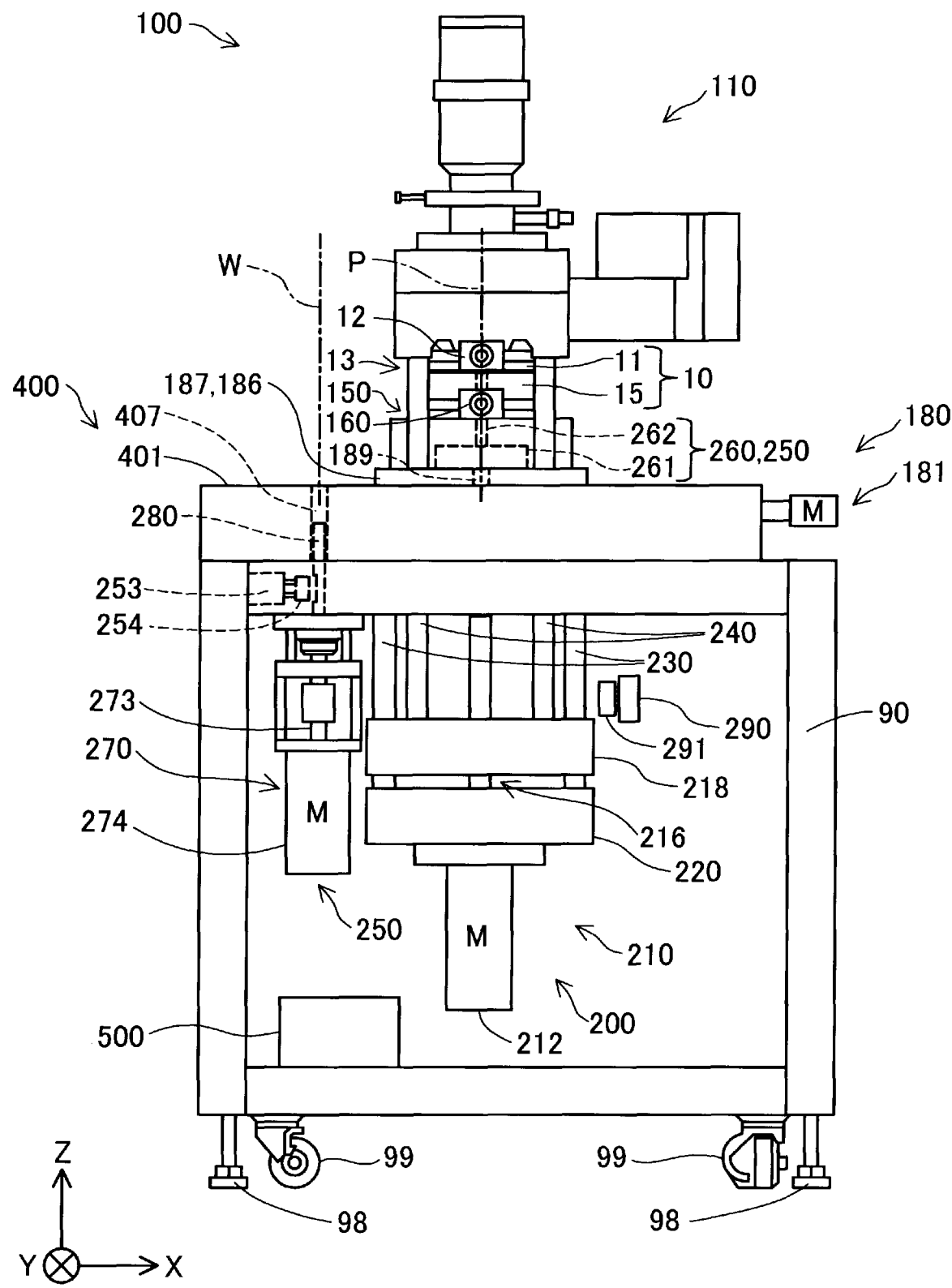
FIG. 6 is a second diagram illustrating schematic configuration of the injection molding machine according to the first embodiment.

FIG. 6 is a second diagram showing schematic configuration of the injection molding machine 100 in the first embodiment. FIG. 6 shows a state in which the die-casting mold 10 installed in the injection molding machine 100 is clamped. As shown in FIGS. 5 and 6, the mold clamping device 200 moves the injection unit 110 and the upper mold 11 along the vertical direction by drive of the mold clamping motor 212 to perform the mold clamping and the mold opening of the die-casting mold 10. More specifically, when the driving force of the mold clamping motor 212 is transmitted to the ball screw portion 216, the movable plate 218 coupled to the ball screw portion 216 moves in the Z direction along the first brace section 230. Then, the injection unit 110 and the upper mold 11, which are fixed to the movable plate 218 via the second brace section 240, move in the Z direction. By moving the movable plate 218 in the −Z direction, the mold clamping device 200 can move the injection unit 110 and the upper mold 11 in the −Z direction with respect to the lower mold 15 to perform mold clamping. By moving the movable plate 218 in the +Z direction, the mold clamping device 200 can move the injection unit 110 and the upper mold 11 in the +Z direction with respect to the lower mold 15 to perform mold opening. An injection molding machine that performs mold opening and mold clamping along the vertical direction, such as the injection molding machine 100, may be referred to as an upright-type injection molding machine.

The position change section 180 is configured to move the lower mold support section 150 linearly along a crossing direction that is a direction crossing the vertical direction. In this embodiment, the position change section 180 is configured to move the lower mold support section 150 linearly along the X direction. The position change section 180 includes a movable section 186 for supporting the lower mold support section 150 and an electric actuator 181 for moving the movable section 186. The electric actuator 181 includes a ball screw and a motor for rotating the ball screw. The position change section 180 according to the present embodiment moves the movable section 186 so as to slide in the X direction with respect to the base 400 by driving the electric actuator 181. Drive of the electric actuator 181 is controlled by the control section 500.

Figure 7:
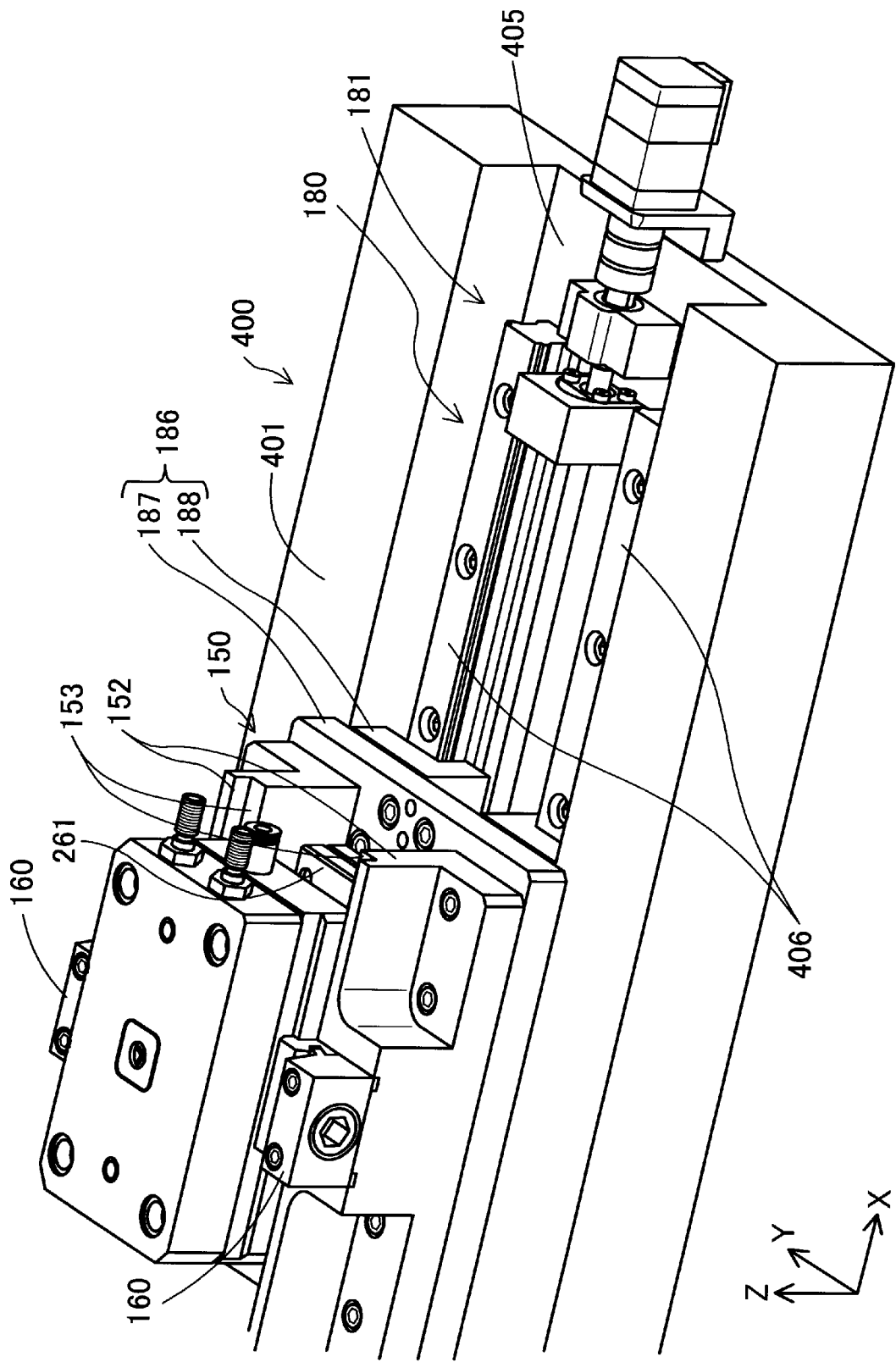
FIG. 7 is a perspective view showing the lower mold support section and the position change section.

FIG. 7 is a perspective view showing the lower mold support section 150 and the position change section 180. In FIG. 7, the second brace section 240 is omitted. The electric actuator 181 of the position change section 180 is disposed along the X direction in a recess 405 formed in the base 400. The recess 405 is a portion where a top surface 401 of the base 400 is recessed downward and is formed along the X direction.

Further, a linear guide 406 is provided in the recess 405. The linear guide 406 functions as a guide for the movable section 186 moved by the electric actuator 181. The linear guide 406 is configured by a pair of rail-shaped members that are elongated in the X direction and that are parallel to each other and is fixed to the bottom surface of the recess 405 via bolts.

The movable section 186 has a plate section 187 which is a rectangular plate-shaped member supporting the lower mold support section 150 and a leg section 188 which supports the plate section 187. The plate section 187 and the leg section 188 are fixed to each other via bolts. The leg section 188 is coupled to the electric actuator 181. The leg section 188 has a shape that engages with the linear guide 406 in the Y direction. Since movement of the movable section 186 along the X direction is allowed and movement of the movable section 186 along the Y direction is regulated by the engagement between the leg section 188 and the linear guide 406, the movable section 186 can be stably moved along the X direction by drive of the electric actuator 181.

The lower mold support section 150 has a pair of blocks 152 arranged to face each other in the Y direction. Each block 152 is fixed to the top surface of the plate section 187 via bolts. Each block 152 has an edge 153 for mounting the lower mold 15. The lower mold clamp 160 described above is provided on the top surface of the block 152. More specifically, a lower mold clamp 160 is provided on the top surface of each block 152. The lower mold clamp 160 clamps and fixes the lower mold 15 placed on the edge 153 of the block 152 in the Y direction.

Figure 8:
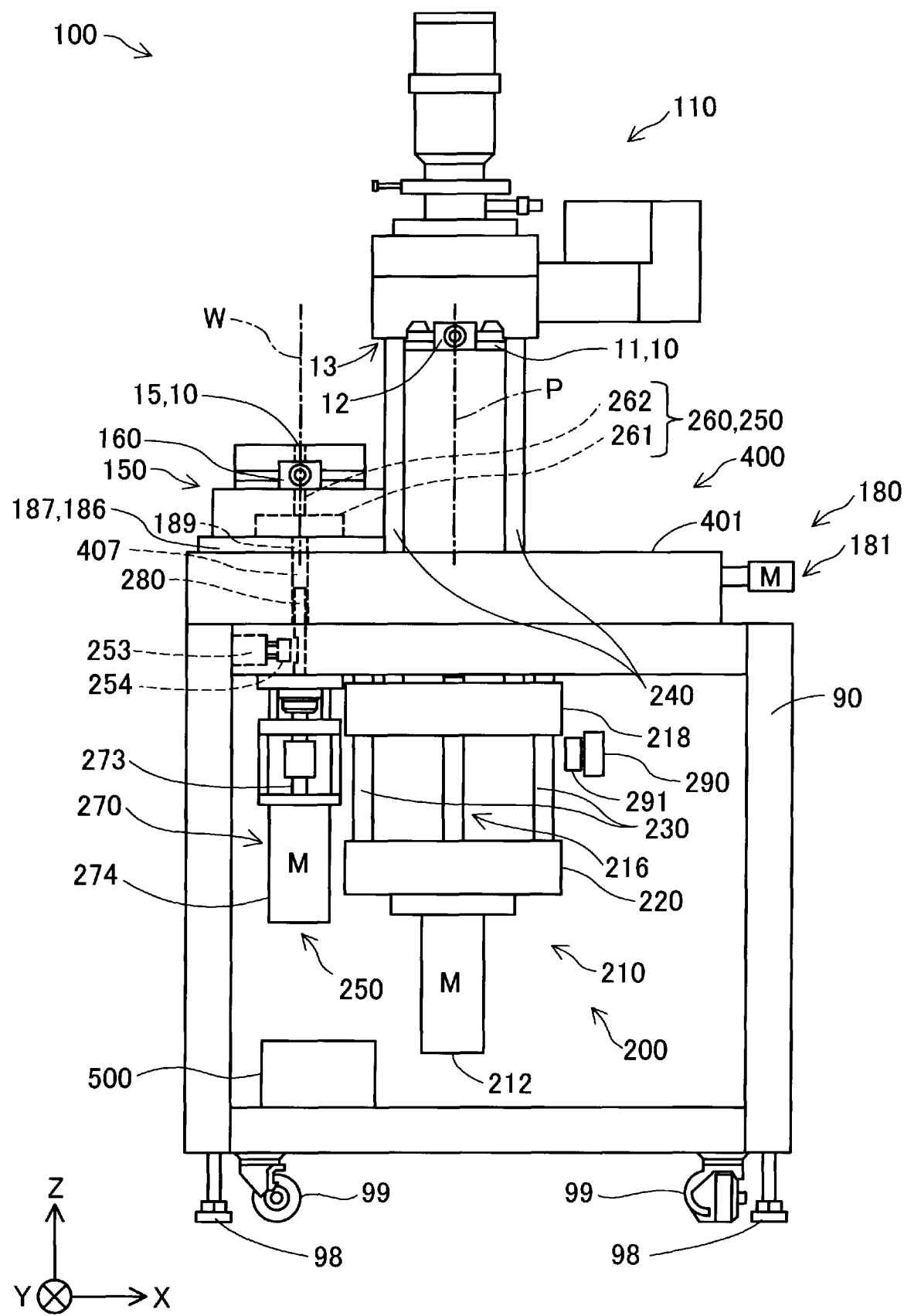
FIG. 8 is a third view showing schematic configuration of the injection molding machine in the first embodiment.

FIG. 8 is a third diagram showing schematic configuration of the injection molding machine 100 in the first embodiment. FIG. 8 shows a state in which the lower mold support section 150 is positioned further in the −X direction than the case shown in FIG. 5 by movement of the lower mold support section 150 caused by the position change section 180. The position change section 180 is configured to move the lower mold support section 150 to switch between a state shown in FIG. 5 in which the lower mold 15 is positioned at the injection position P and a state shown in FIG. 8 in which the lower mold 15 is positioned at a position different from the injection position P. The injection position P refers to a position where the lower mold 15 and the upper mold 11 face each other. The position change section 180 according to the present embodiment moves the lower mold support section 150 in the X direction to position the lower mold 15 at the injection position P and the waiting position W. The waiting position W is located in the −X direction of the injection position P.

The ejector section 250 is a mechanism for removing a molded article from the lower mold 15. The ejector section 250 according to this embodiment removes the molded article from the lower mold 15 at the waiting position W described above. The ejector section 250 includes a main body section 260 for pushing up a molded article from the lower mold 15 and an ejector drive section 270 for operating the main body section 260. In the present embodiment, the main body section 260 is disposed in the lower mold 15 and is moved along the X direction together with the lower mold 15 by the position change section 180. The ejector drive section 270 is fixed to the base 400.

The main body section 260 has a flat plate-shaped ejector plate 261 and a shaft-shaped ejector pin 262 fixed to the ejector plate 261. The ejector plate 261 is disposed between the lower mold 15 and the plate section 187 in the Z direction in a state where the lower mold 15 is supported by the lower mold support section 150. The ejector pin 262 is inserted into a through-hole formed so as to pass through a portion defining the cavity of the lower mold 15 in the Z direction. As shown in FIG. 5, a hole section 189 through the plate section 187 in the Z direction is provided at a position of the plate section 187 overlapping with at least a part of the ejector plate 261 when viewed along the Z direction. In this embodiment, the hole section 189 is provided in the middle section of the plate section 187 in the X and Y directions.

The ejector drive section 270 is composed of a ball screw 273 and the ejector motor 274 for driving the ejector pin 262 by rotating the ball screw 273. As shown in FIG. 5, the ejector drive section 270 is fixed to the base 400 lower positions of the base 400. Drive of the ejector drive section 270 is controlled by the control section 500.

A contact section 280 is coupled to the ball screw 273 of the ejector drive section 270. The contact section 280 is disposed in a cavity 407 that extends through the base 400 in the Z direction.

The ejector drive section 270 can push up the main body section 260 by the contact section 280 by moving the contact section 280 coupled to the ball screw 273 in the +Z direction in a state in which the lower mold 15 is positioned at the waiting position W shown in FIG. 8. More specifically, the contact section 280 protrudes from the cavity 407 in the +Z direction by driving the ejector drive section 270 and further passes through the hole section 189 formed in the plate section 187 in the +Z direction, thereby coming into contact with the ejector plate 261. Then, in a state in which the contact section 280 is in contact with the ejector plate 261, the main body section 260 can be pushed up in the +Z direction by further movement in the +Z direction. The molded article is pushed up in the +Z direction by the ejector pin 262 of the main body section 260 that has been pushed up, and the molded article is removed from the lower mold 15. A spring (not shown) is disposed between the ejector plate 261 and the lower mold 15 in the Z direction so as to lower the ejector pin 262 pushed up by the ejector plate 261.

Like the mold clamping motor 212, the ejector motor 274 in this embodiment is constituted by a motor with an electromagnetic brake. Using the electromagnetic brake, the ejector motor 274 regulates rotation of a motor shaft by generating a braking force in a state where voltage is not applied to the excitation coil and allows the rotation of the motor shaft in a state where voltage is applied to the excitation coil. That is, the electromagnetic brake provided in the ejector motor 274 regulates the rotation of the ejector motor 274 when no voltage is applied to the ejector motor 274. The electromagnetic brake provided in the ejector motor 274 is referred to as a second electromagnetic brake.

The ejector section 250 according to the present embodiment has a second auxiliary brake 253. The second auxiliary brake is fixed to the housing 90. The second auxiliary brake 253 regulates movement of the ejector pin 262. The second auxiliary brake 253 includes an actuator 254 engageable with the contact section 280. As the actuator 254, for example, an electric cylinder or an air cylinder can be used. The operation of the second auxiliary brake 253 is controlled by the control section 500.

When application of voltage to the ejector motor 274 is stopped, the second auxiliary brake 253 restricts the ejector pin 262 supported by the contact section 280 from moving downward by engaging the actuator 254 with the contact section 280. The control section 500 stops application of voltage to the ejector motor 274 when the detection section 30 detects that the door 6 is open or detects the intrusion of foreign matter. Therefore, when the detection section 30 detects that the door 6 is open or detects the intrusion of foreign matter, the second auxiliary brake 253 assists the second electromagnetic brake provided in the ejector motor 274, and more reliably regulates the downward movement of the ejector pin 262. The second electromagnetic brake and the second auxiliary brake 253 are referred to as a "second brake section".

Figure 9:
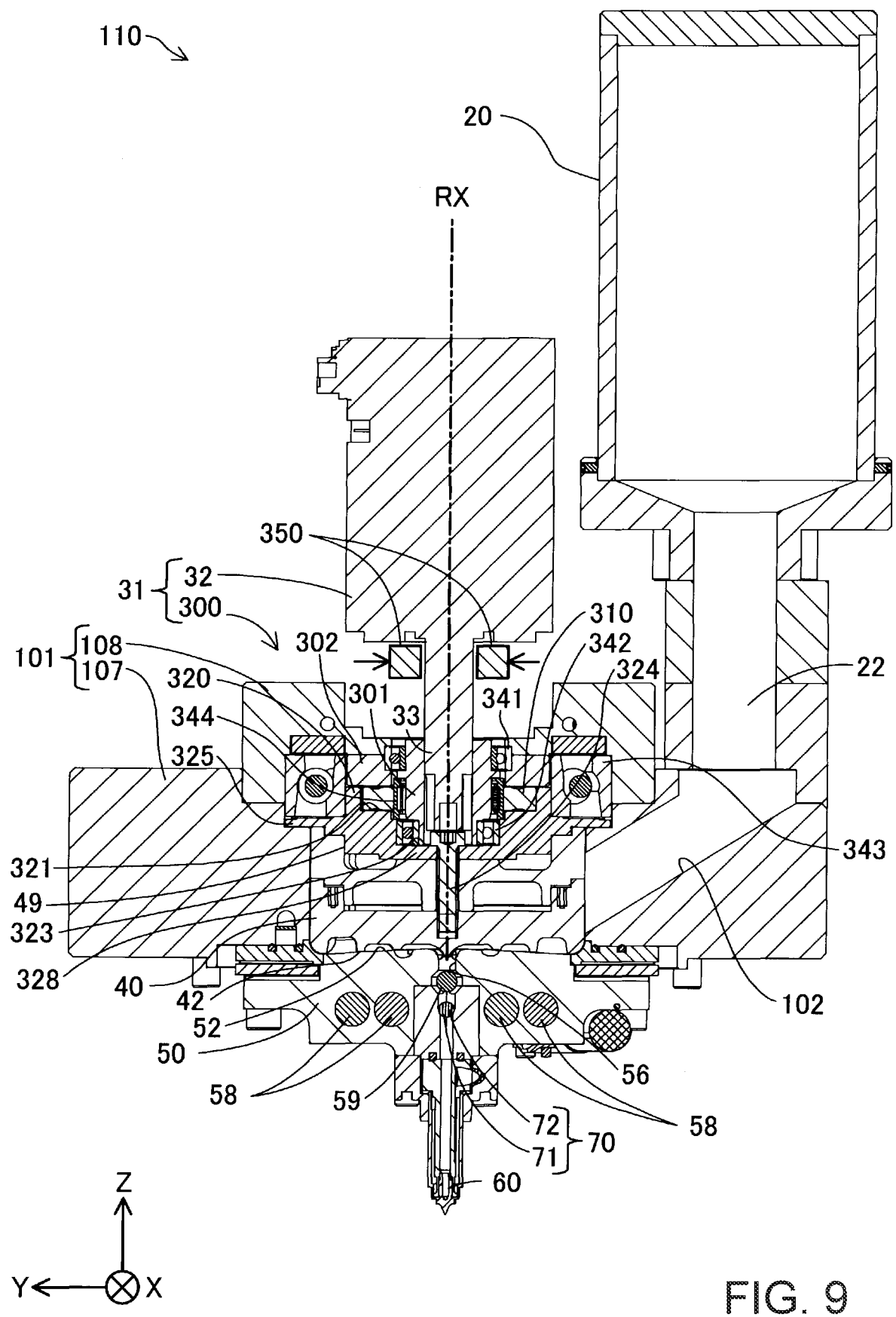
FIG. 9 is a cross sectional view illustrating configuration of an injection unit according to the first embodiment.

FIG. 9 is a cross-sectional view showing configuration of the injection unit 110 according to the first embodiment. The injection unit 110 includes a material supply section 20, a flat screw 40, a barrel 50, a heating section 58, a nozzle 60, and an injection control mechanism 70. The flat screw 40 and the barrel 50 constitute a plasticizing section for plasticizing material to produce a molding material.

The injection unit 110 generates a molding material by using the flat screw 40, the barrel 50, and the heating section 58 to plasticize at least a part of the material supplied from the material supply section 20 to between the flat screw 40 and the barrel 50. The produced molding material is injected from the nozzle 60 toward the cavity of the die-casting mold 10. In the present embodiment, "plasticization" is a concept including melting, and is a change from a solid to a state having fluidity. Specifically, in the case of a material that undergoes a glass transition, plasticization means that the temperature of the material is set to be equal to or higher than its glass transition point. In the case of a material that does not undergo glass transition, plasticization means that the temperature of the material is set to be equal to or higher than its melting point.

The material supply section 20 in the present embodiment is constituted by a hopper. The material supply section 20 contains a material in the form of pellets, powder, or the like. In the present embodiment, an ABS resin formed in a pellet shape is used as material. A supply path 22 is provided below the material supply section 20. The supply path 22 is coupled to an introduction path 102 formed in a case 107. The material supply section 20 supplies a material between the flat screw 40 and the barrel 50 via the supply path 22 and the introduction path 102.

The flat screw 40 is also referred to as a rotor, a scroll, or simply a screw. The flat screw 40 is rotationally driven around a rotation axis RX along the Z direction by a screw drive section 31 configured by the screw motor 32 and a speed reducer 300. The rotation of the flat screw 40 by the screw drive section 31 is controlled by the control section 500.

The flat screw 40 and the speed reducer 300 are housed in an accommodation section 101. The accommodation section 101 includes the case 107 and an upper cover 108. The case 107 is a portion for accommodating the periphery of the flat screw 40 and the periphery of the speed reducer 300 so as to surround them in the horizontal direction. The upper cover 108 is a portion disposed on the upper portion of the case 107 so as to cover the flat screw 40 and the speed reducer 300 from above. The screw motor 32 is disposed above the upper cover 108 such that an output shaft 33 is inserted into the accommodation section 101 via an opening section provided in the upper cover 108.

At the center of the barrel 50, a communication hole 56 into which the molding material flows is provided. An injection cylinder 71 of the injection control mechanism 70 (to be described later) is coupled to the communication hole 56. The communication hole 56 is provided with a check valve 59 upstream of the injection cylinder 71.

Figure 10:
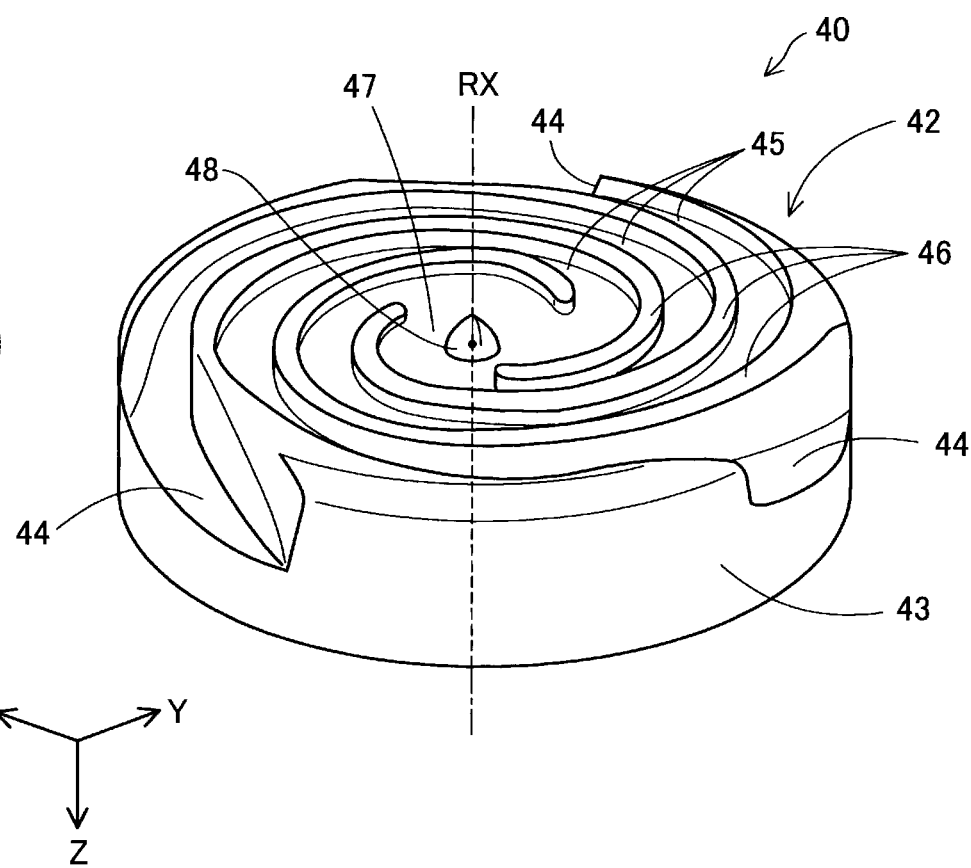
FIG. 10 is a perspective view illustrating schematic configuration of a flat screw.

FIG. 10 is a perspective view illustrating schematic configuration of the flat screw 40. The flat screw 40 has a substantially cylindrical shape in which a length in a direction along the rotation axis RX is shorter than a length in a direction orthogonal to the rotation axis RX. A spiral groove 45 is formed around a middle section 47 on a groove formed surface 42 facing the barrel 50 on the flat screw 40. The groove 45 communicates with a material charge chute 44 formed in a screw side surface 43 of the flat screw 40. The material supplied from the material supply section 20 is supplied to the groove 45 through the material charge chute 44. The grooves 45 are formed by being separated from each other by ridge section 46. FIG. 10 shows an example in which three grooves 45 are formed, but the number of grooves 45 may be one, two, or four or more. The groove 45 is not limited to a spiral shape, but may be a helix or an involute curve shape, or may extend in an arc from the middle section to the periphery.

The flat screw 40 according to the present embodiment includes an accumulation suppression section 48 protruding toward the communication hole 56 in the middle section 47. In the present embodiment, the accumulation suppression section 48 has a substantially conical shape, and the central axis of the accumulation suppression section 48 substantially coincides with the rotation axis RX of the flat screw 40. A distal end of the accumulation suppression section 48 is disposed inside the communication hole 56 formed in the barrel 50. By the accumulation suppression section 48, the molding material is efficiently guided from the middle section 47 to the communication hole 56, and accumulation of the molding material in the middle section 47 is suppressed. In another embodiment, the flat screw 40 may not include the accumulation suppression section 48.

Figure 11:
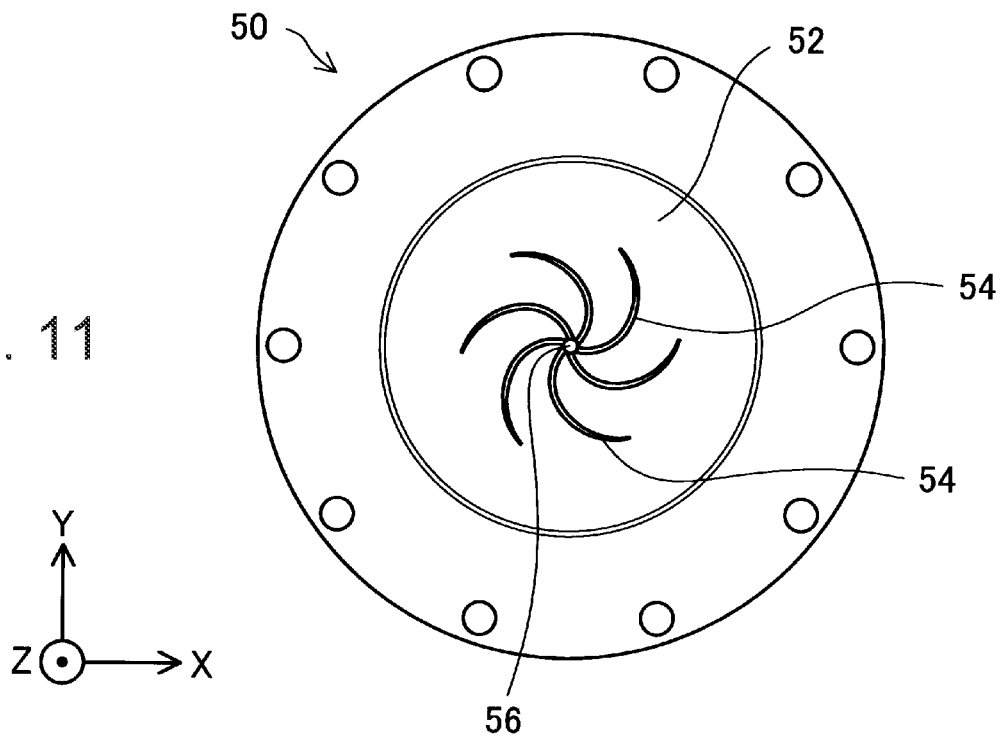
FIG. 11 is a schematic plan view of the barrel.

FIG. 11 is a schematic plan view of the barrel 50. The barrel 50 has a facing surface 52 that faces the groove formed surface 42 of the flat screw 40. As shown in FIG. 11, the communication hole 56 described above is formed so as to open at a middle section of the facing surface 52. A plurality of guide grooves 54 coupled to the communication hole 56 and extended vortically from the communication hole 56 toward the outer periphery is formed in the facing surface 52. In another embodiment, the guide groove 54 may not be coupled to the communication hole 56. The barrel 50 may not be provided with the guide groove 54.

The heating section 58 shown in FIG. 9 heats the material supplied between the groove formed surface 42 of the flat screw and the facing surface 52 of the barrel 50. In this embodiment, four heating sections 58 are provided in the barrel 50. The output of the heating section 58 is controlled by the control section 500.

In the present embodiment, the heating section 58 and the mold clamping motor 212 are coupled to different power supplies. Therefore, the control section 500 can independently control application of voltage to the heating section 58 and application of voltage to the mold clamping motor 212. In the present embodiment, when the detection section 30 detects that the door 6 is open or detects the intrusion of foreign matter, the control section 500 stops application of voltage to the mold clamping motor 212, but does not stop application of voltage to the heating section 58.

The material supplied to the groove 45 of the flat screw 40 is introduced to the middle section 47 of the flat screw 40 by rotation of the flat screw 40 while being plasticized between the groove formed surface 42 of the flat screw 40 and the facing surface 52 of the barrel 50 by rotation of the flat screw 40 and heating by the heating section 58. The material flowing into the middle section 47 is sent out to the communication hole 56 provided at the center of the barrel 50 and is further guided to the injection control mechanism 70 from the communication hole 56.

As shown in FIG. 9, the injection control mechanism 70 includes the injection cylinder 71 and plungers 72. The injection control mechanism 70 has a function of injecting the forming material in the injection cylinder 71 into the cavity of the die-casting mold 10. The injection control mechanism 70 controls an injection amount of the molding material from the nozzle 60 under the control of the control section 500. The injection cylinder 71 is a substantially cylindrical member coupled to the communication hole 56 of the barrel 50. In this embodiment, the injection cylinder 71 is arranged along the X direction. A plunger 72 is inserted into the injection cylinder 71. The plunger 72 slides inside the injection cylinder 71 and pressure feeds the forming material in the injection cylinder 71 to the nozzle 60. The plunger 72 is driven by a motor (not shown).

The speed reducer 300 includes a substantially cylindrical eccentric structure 301 fixed to the output shaft 33 of the screw motor 32, a first gear 310 configured as a planetary gear, and a second gear 320 configured as a sun internal teeth gear. The speed reducer 300 in this embodiment is a coaxial type speed reducer in which an input shaft and an output shaft are on the same axis.

An end portion of the eccentric structure 301 on the side of screw motor 32 is axially supported by a first ball bearing 341 fixed to the upper cover 108. An end portion of the eccentric structure 301 on the side of the flat screw 40 is axially supported by a second ball bearing 342 press-fitted into an inner periphery of the second gear 320. An outer circumference of the portion of the eccentric structure 301 fixed to the first ball bearing 341 and an outer circumference of the portion fixed to the second ball bearing 342 have a perfect circular shape centered on the output shaft of the screw motor 32. On the other hand, a portion of the eccentric structure 301 sandwiched between the first ball bearing 341 and the second ball bearing 342 has a perfect circular shape having a central axis eccentric to the output shaft of the screw motor 32. In the following description, the eccentric structure 301 simply refers to a portion of the eccentric structure 301 sandwiched between the first ball bearing 341 and the second ball bearing 342.

Figure 12:
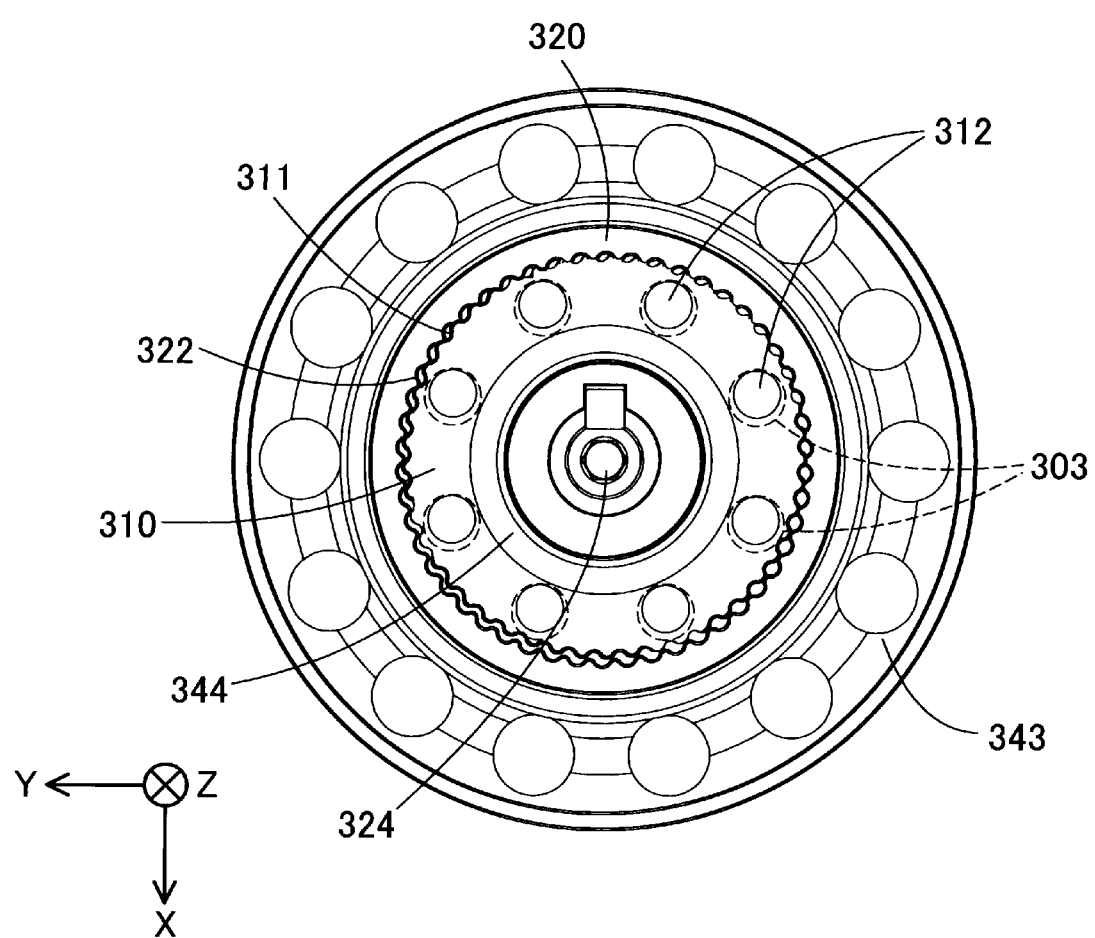
FIG. 12 is a plan view of the first and second gears viewed from the −Z direction.

FIG. 12 is a plan view of the first gear 310 and the second gear 320 provided in the speed reducer 300 as viewed from the −Z direction. The first gear 310 has an annular shape, and a needle bearing 344 is press-fitted and fixed to an inner peripheral portion thereof. Wavy external teeth 311 are formed on the outer periphery of the first gear 310. A plurality of pins 312 is arranged on the first gear 310 at equal intervals in the circumferential direction as viewed from the −Z direction. Each of the pins 312 is disposed in a pin receiving recess section 303. A plurality of pin receiving recess sections 303 is formed in an annular pin receiving section 302 fixed around the eccentric structure 301 in the upper cover 108 shown in FIG. 9. Each pin receiving recess section 303 opens at the −Z direction side and has a diameter larger than the diameter of the pin 312. Therefore, the pin 312 can move in the pin receiving recess section 303 in the X direction and the Y direction, which are directions perpendicular to the rotation axis RX.

As shown in FIG. 9, the second gear 320 has a bottomed cylindrical shape whose end surface on the +Z direction side is open. A first recessed portion 321 is formed in an end surface of the second gear 320 in the +Z direction, and a second recessed portion 323 is further formed in a bottom section of the first recessed portion 321. The first gear 310 is housed in the first recessed portion 321. Wave-shaped internal teeth 322, which contact the external teeth 311 of the first gear 310 shown in FIG. 12, are formed in the inner circumference of the first recessed portion 321. The above-described second ball bearing 342 is press-fitted and fixed in the second recessed portion 323.

A recess 49 is formed in the end face of the flat screw 40 on the +Z direction side, and a bottom section 328 of the second gear 320 is fitted in the recess 49. The recess 49 and the bottom section 328 are subjected to idling prevention processing such as D-cut processing. The flat screw 40 is fixed to the bottom section 328 by a bolt 324 as a fixing section in the direction of the rotation axis RX. That is, the flat screw 40 is integrated with the second gear 320. The second gear 320 and the flat screw 40 may be fixed to each other not only by the bolt 324 but also by another fixing section such as a rivet. Further, the number of bolts 324 is not limited to one, and a plurality of bolts may be used to fix the second gear 320 and the flat screw 40.

A flange section 325 is formed on the outer periphery of the second gear 320. A portion of the second gear 320 on the +Z direction side of the flange section 325 is axially supported by a third ball bearing 343 fixed to the upper cover 108 on the outer peripheral side of the pin receiving section 302. In this embodiment, the third ball bearing 343 is configured as a single-row angular bearing that receives a load in the +Z direction from the flat screw 40.

The operation of the speed reducer 300 will be described. When the screw motor 32 rotates, the eccentric structure 301 fixed to the output shaft 33 of the screw motor 32 rotates. The eccentric structure 301 partially contacts the needle bearing 344 provided on the inner periphery of the first gear 310, while rotating. When the eccentric structure 301 comes into contact with the needle bearing 344, the first gear 310 receives a driving force from the eccentric structure 301 and swings in the X direction and the Y direction intersecting the rotation axis RX in a state in which the pin 312 is accommodated in the pin receiving recess section 303. Due to movement of the first gear 310, the external teeth 311 of the first gear 310 partially and sequentially come into contact with the internal teeth 322 of the second gear 320. The second gear 320 rotates at a predetermined reduction ratio determined by the number of the external teeth 311 of the first gear 310 and the number of the internal teeth 322 of the second gear 320, and the flat screw 40 fixed to the second gear 320 rotates in the case 107.

The injection unit 110 according to the present embodiment includes a third brake section 350. The third brake section 350 regulates the rotation of the flat screw 40. The third brake section 350 in the present embodiment is configured as a friction brake having a brake shoe configured to contact the output shaft 33 of the screw motor 32. The operation of the third brake section 350 is controlled by the control section 500.

When application of voltage to the screw motor 32 is stopped, the third brake section 350 brings the brake shoe into contact with the output shaft 33 to regulate rotation of the flat screw 40. The control section 500 stops application of voltage to the screw motor 32 when the detection section 30 detects that the door 6 is open or detects the intrusion of foreign matter, for example. Therefore, when the detection section 30 detects that the door 6 is open or detects the intrusion of foreign matter, the third brake section 350 prevents the flat screw 40 from continuing to rotate due to inertia. In the present embodiment, the third brake section 350 is configured to contact the output shaft 33, but the third brake section 350 may be configured to contact a side surface of the flat screw 40.

In the injection molding device 5 according to the first embodiment described above, even when application of voltage to the mold clamping motor 212 is stopped caused by the open or closed state of the door 6, the intrusion of foreign matter into the housing 90, and the like, movement of the upper mold 11 in the vertical direction can be regulated by the first brake section, that is, the first electromagnetic brake and the first auxiliary brake 290 provided in the mold clamping motor 212. Therefore, unintentional movement of the upper mold 11 can be suppressed. In particular, since the first brake section according to the present embodiment can suppress the downward movement of the upper mold 11 in the mold open state, it is possible to suppress shock on the lower mold 15 due to the unintended lowering of the upper mold 11.

Further, in the present embodiment, since the detection section 30 includes the light emitting section 23 and the light receiving section 24, the intrusion of foreign matter can be optically detected.

Further, in the present embodiment, even when application of voltage to the ejector motor 274 is stopped due the door 6 being opened or closed, the intrusion of foreign matter into the housing 90, and the like, movement of the ejector pin 262 can be regulated by the second brake section, that is, the second electromagnetic brake and the second auxiliary brake 253 provided in the ejector motor 274. In particular, since the lower mold 15 is provided with a spring for returning the pushed-up ejector pin 262 to the original position, when application of voltage to the ejector motor 274 is stopped in a state where the ejector pin 262 is pushed up, the ejector pin 262 is easily lowered. However, in the present embodiment, since movement of the ejector pin 262 can be regulated by the second brake section, it is possible to more reliably suppress the ejector pin 262 in the pushed-up state from being unintentionally lowered.

Further, in the present embodiment, the heating section 58 and the mold clamping motor 212 are coupled to different power supplies. Therefore, even when the control section 500 stops application of voltage to the mold clamping motor 212 in a case where the detection section 30 detects that the door 6 is open or detects the intrusion of foreign matter, application of voltage to the heating section 58 can be continued. As a result, since the barrel 50 can be prevented from being cooled when the molded article is taken out from the opening section 21 or the door 6, the plasticized state of the molding material can be maintained, and the molded article can be efficiently manufactured. In another embodiment, the control section 500 can also stop application of voltage to the heating section 58 when the detection section 30 detects that the door 6 is open or detects the intrusion of foreign matter.

Further, in the present embodiment, when application of voltage to the screw motor 32 is stopped due to the open or closed state of the door 6, the intrusion of foreign matter into the housing 90, or the like, rotation of the flat screw 40 is stopped by the third brake section 350. Therefore, since it is possible to prevent the flat screw 40 from continuously rotating due to inertia after application of voltage to the screw motor 32 is stopped, it is possible to prevent a load from being applied to the output shaft 33 or the speed reducer 300.

In addition, in the present embodiment, the injection unit 110 has the flat screw 40 and the barrel 50, and the flat screw 40 and the barrel 50 are disposed in order from the top in the vertical direction. Therefore, compared with the case where the injection unit 110 is constituted by an in-line screw, the injection molding device 5 can be made smaller. In another embodiment, an in-line screw may be employed instead of the flat screw 40.

B. Second Embodiment

Figure 13:
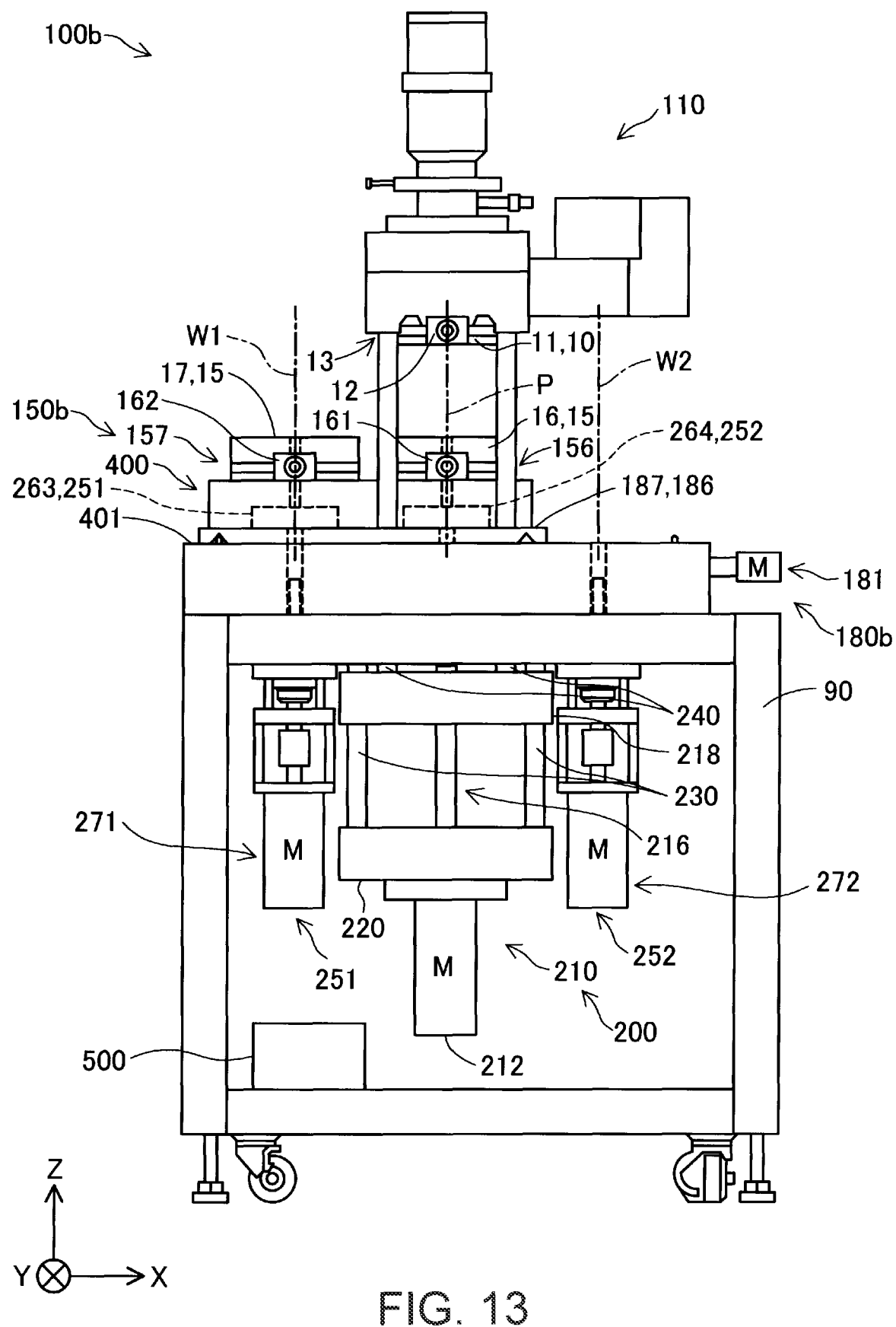
FIG. 13 is a first diagram showing schematic configuration of an injection molding machine according to the second embodiment.

FIG. 13 is a first diagram illustrating schematic configuration of an injection molding machine 100b according to the second embodiment. In this embodiment, the lower mold 15 includes a first lower mold 16 and a second lower mold 17. A lower mold support section 150b includes a first support section 156 for supporting the first lower mold 16 and a second support section 157 for supporting the second lower mold 17. The structure of the injection molding machine 100b is the same as in the first embodiment unless otherwise described. In FIG. 13, the first auxiliary brake 290 and the second auxiliary brake 253 are not shown.

Figure 14:
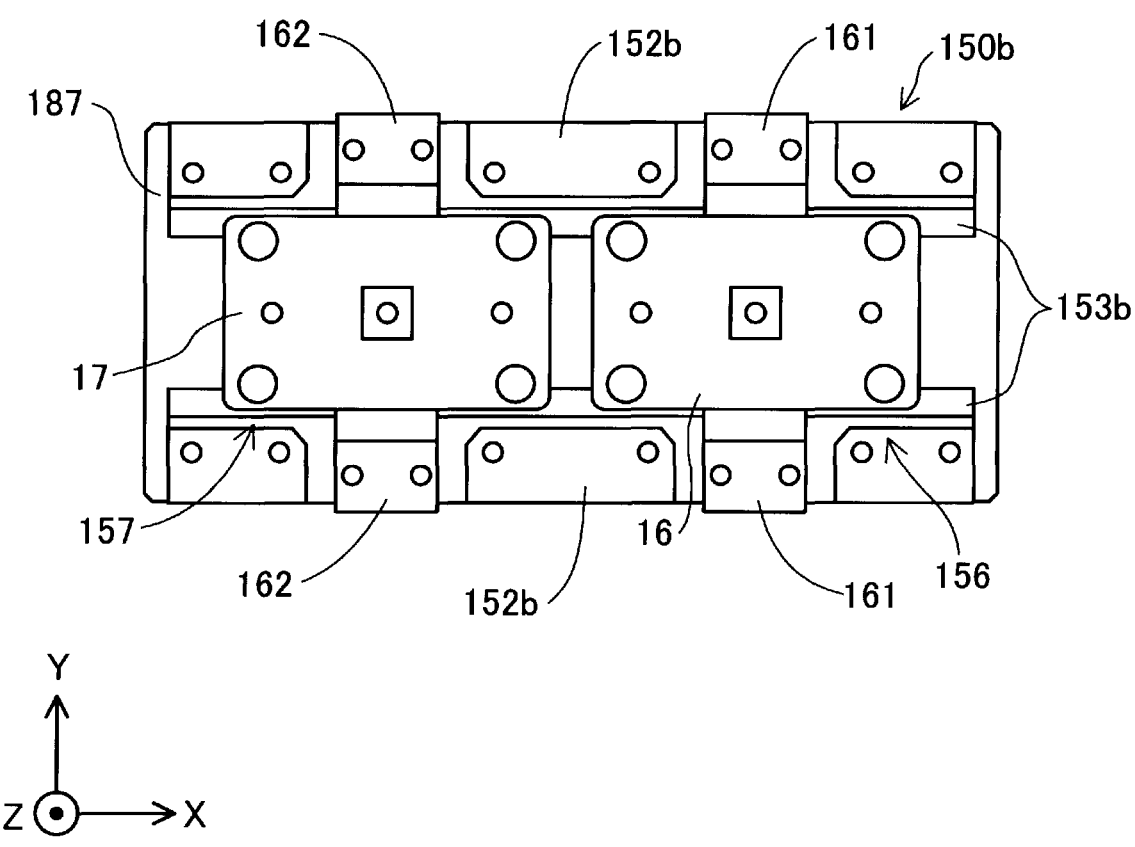
FIG. 14 is a plan view showing schematic configuration of a lower mold support section in the second embodiment.

FIG. 14 is a plan view showing schematic configuration of the lower mold support section 150b in the second embodiment. FIG. 14 shows a state in which the lower mold support section 150b and the plate section 187 supporting the lower mold support section 150b are viewed from above. As shown in FIGS. 13 and 14, the lower mold support section 150b includes the first support section 156 and the second support section 157 described above. The first support section 156 is a portion for supporting the first lower mold 16 of edges 153b of a pair of blocks 152b constituting the lower mold support section 150b. The second support section 157 is a portion for supporting the second lower mold 17 of the edges 153b of the blocks 152b. The first support section 156 is positioned in the +X direction of the second support section 157. A pair of first lower mold clamps 161 and a pair of second lower mold clamps 162 are provided on the top surface of the blocks 152b. Similarly to the lower mold clamp 160 described in the first embodiment, the first lower mold clamp 161 sandwiches and fixes the first lower mold 16 supported by the first support section 156 in the Y direction. The second lower mold clamp 162 sandwiches and fixes the second lower mold 17 supported by the second support section 157 in the Y direction.

A position change section 180b is configured to move between the first support section 156 and the second support section 157. In the present embodiment, the position change section 180b linearly moves the first support section 156 and the second support section 157 along an intersecting direction intersecting the vertical direction. To be more specific, similarly to the first embodiment, the position change section 180b moves the movable section 186 supporting the lower mold support section 150b so as to slide in the X direction with respect to the base 400 by driving the electric actuator 181. Accordingly, the first support section 156 and the second support section 157 move linearly along the X direction in conjunction with each other.

Figure 15:
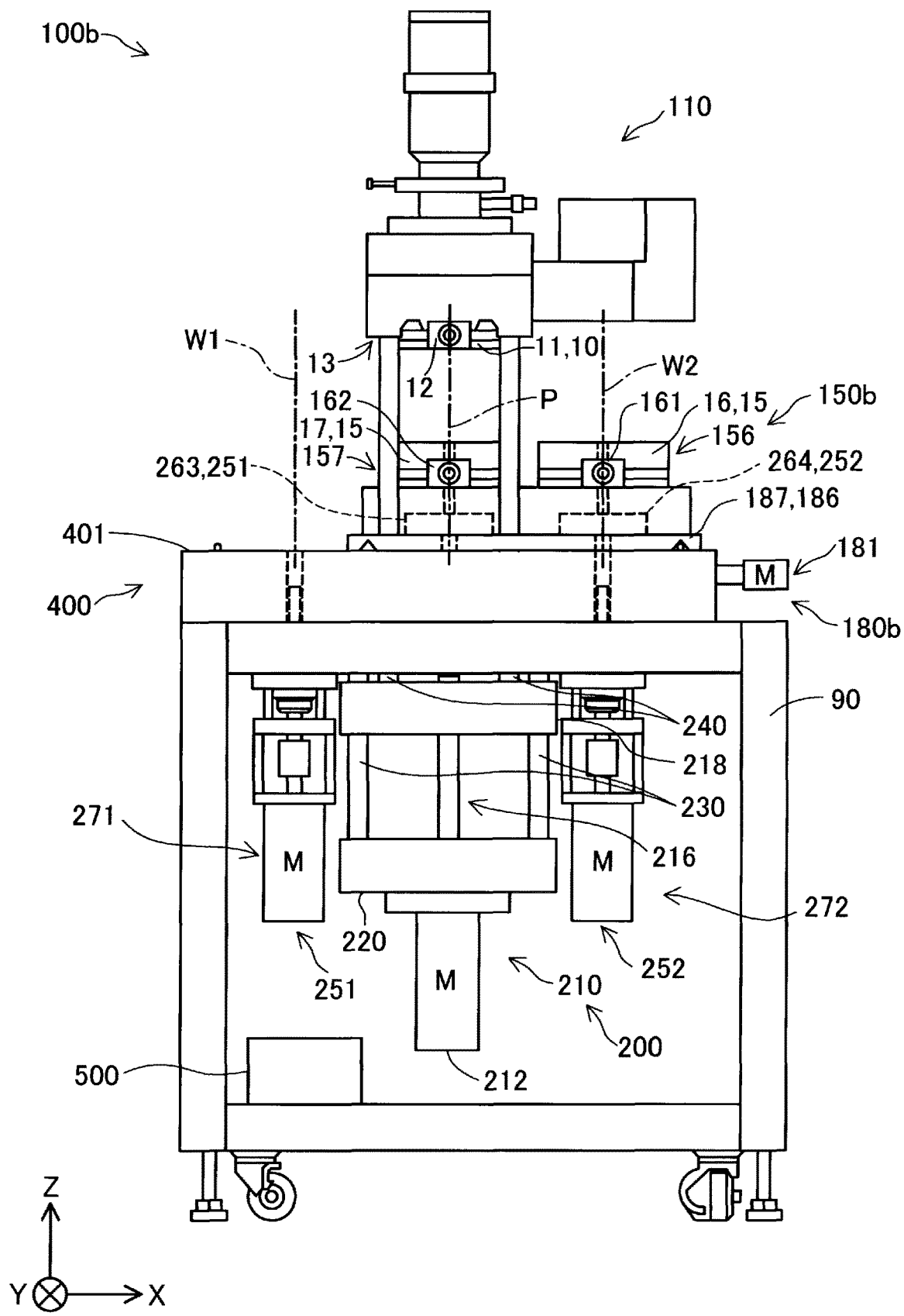
FIG. 15 is a second diagram illustrating schematic configuration of the injection molding machine according to the second embodiment.

FIG. 15 is a second diagram showing schematic configuration of the injection molding machine 100b in the second embodiment. FIG. 15 shows a state in which the lower mold support section 150b is positioned in the +X direction as compared with the case shown in FIG. 13 due to movement of the lower mold support section 150b by the position change section 180b. The position change section 180b is configured to switch the supported state in which the die-casting mold 10 is supported by the support section 140 between the first supported state and the second supported state by moving the first support section 156 and the second support section 157. As shown in FIG. 13, the first supported state refers to a state in which the first lower mold 16 is located at an injection position P facing the upper mold 11, and the second lower mold 17 is located at a position different from the injection position P. As shown in FIG. 15, the second supported state refers to a state in which the second lower mold 17 is located at the injection position P facing the upper mold 11, and the first lower mold 16 is located at a position different from the injection position P.

As shown in FIG. 13, in the present embodiment, the position change section 180b positions the second lower mold 17 at the first waiting position W1 in the first supported state. Further, as shown in FIG. 15, the position change section 180b positions the first lower mold 16 at the second waiting position W2 in the second supported state. The first waiting position W1 and the second waiting position W2 are both different from the injection position P. The second waiting position W2 is located on the opposite side of the first waiting position W1 across the ejection position P in the X direction. That is, the first waiting position W1 and the second waiting position W2 are separated from each other by the ejection position P in the X direction. In this embodiment, the first waiting position W1 is located in the −X direction of the injection position P, and the second waiting position W2 is located in the +X direction of the injection position P.

As shown in FIGS. 13 and 15, the injection molding machine 100b in this embodiment has a first ejector section 251 and a second ejector section 252. The first ejector section 251 is a mechanism for removing the molded article from the second lower mold 17 at the first waiting position W1 in the first supported state. The second ejector section 252 is a mechanism for removing a molded article from the first lower mold 16 at the second waiting position W2 in the second supported state.

The configuration of the first ejector section 251 and the configuration of the second ejector section 252 are the same as those of the ejector section 250 described in the first embodiment. The first ejector section 251 is disposed in the second lower mold 17 and includes a first main body section 263 having an ejector pin for pushing up the molded article from the second lower mold 17, and a first ejector driving section 271 having an ejector motor for operating the first main body section 263. The second ejector section 252 is disposed in the first lower mold 16 and includes a second main body section 264 having ejector pins for pushing up the molded article from the first lower mold 16, and a second ejector driving section 272 having an ejector motor for operating the second main body section 264. That is, each of the first ejector section 251 and the second ejector section 252 has an ejector pin and an ejector motor for driving the ejector pin. The ejector motor of the first ejector section 251 and the ejector motor of the second ejector section 252 are positioned below the lower mold support section 150b as a support section. The mold clamping motor 212 is positioned between the ejector motor of the first ejector section 251 and the ejector motor of the second ejector section 252 in the X direction. Although each of the first ejector section 251 and the second ejector section 252 includes the second auxiliary brake 253, the illustration of the second auxiliary brake 253 is omitted in FIGS. 13 and 15.

In the injection molding machine 100b according to the second embodiment described above, by moving the first support section 156 and the second support section 157, it is possible to switch between a first supported state in which the first lower mold 16 is located at the injection position P and the second lower mold 17 is located at a position different from the injection position P, and a second supported state in which the second lower mold 17 is located at the injection position P and the first lower mold 16 is located at a position different from the injection position P. Thus, while a molded article is molded by using one lower mold positioned at the injection position P, the molded article can be removed from the other lower mold positioned at a position different from the injection position P. Therefore, it is possible to increase the manufacturing efficiency of the molded article by using the first lower mold 16 and the second lower mold 17.

In the present embodiment, the ejector motor of the first ejector section 251 and the ejector motor of the second ejector section 252 are positioned below the lower mold support section 150b, and the mold clamping motor 212 is positioned between the ejector motor of the first ejector section 251 and the ejector motor of the second ejector section 252. Therefore, the first ejector section 251, the second ejector section 252, and the mold clamping motor 212 can be efficiently arranged.

In the present embodiment, the position change section 180b arranges the second lower mold 17 at the first waiting position W1 in the first supported state and arranges the first lower mold 16 at the second waiting position W2 opposite to the first waiting position W1 with the injection position P interposed therebetween in the X direction in the second supported state. Therefore, by linearly moving the first support section 156 and the second support section 157 along the X direction by the position change section 180b, it is possible to easily switch between the first supported state and the second supported state.

Further, in the present embodiment, the injection molding machine 100b includes the first ejector section 251 for removing the molded article from the second lower mold 17 at the first waiting position W1, and the second ejector section 252 for removing the molded article from the first lower mold 16 at the second waiting position W2. Therefore, in either the first supported state or the second supported state, the molded article can be removed from the first lower mold 16 or the second lower mold 17 by using the first ejector section 251 or the second ejector section 252.

In the second embodiment, the first support section 156 and the second support section 157 are configured as a part of a pair of the blocks 152b configuring the lower mold support section 150b. On the other hand, the first support section 156 and the second support section 157 may not be configured as the part of the blocks 152b. For example, the first support section 156 and the second support section 157 may be configured separately as holders for holding the first lower mold 16 and the second lower mold 17, respectively. In this case, for example, the position change section 180 may be configured so that the first support section 156 and the second support section 157 can be individually moved, and may switch between the first supported state and the second supported state by individually moving the first support section 156 and the second support section 157.

C. Third Embodiment

Figure 16:
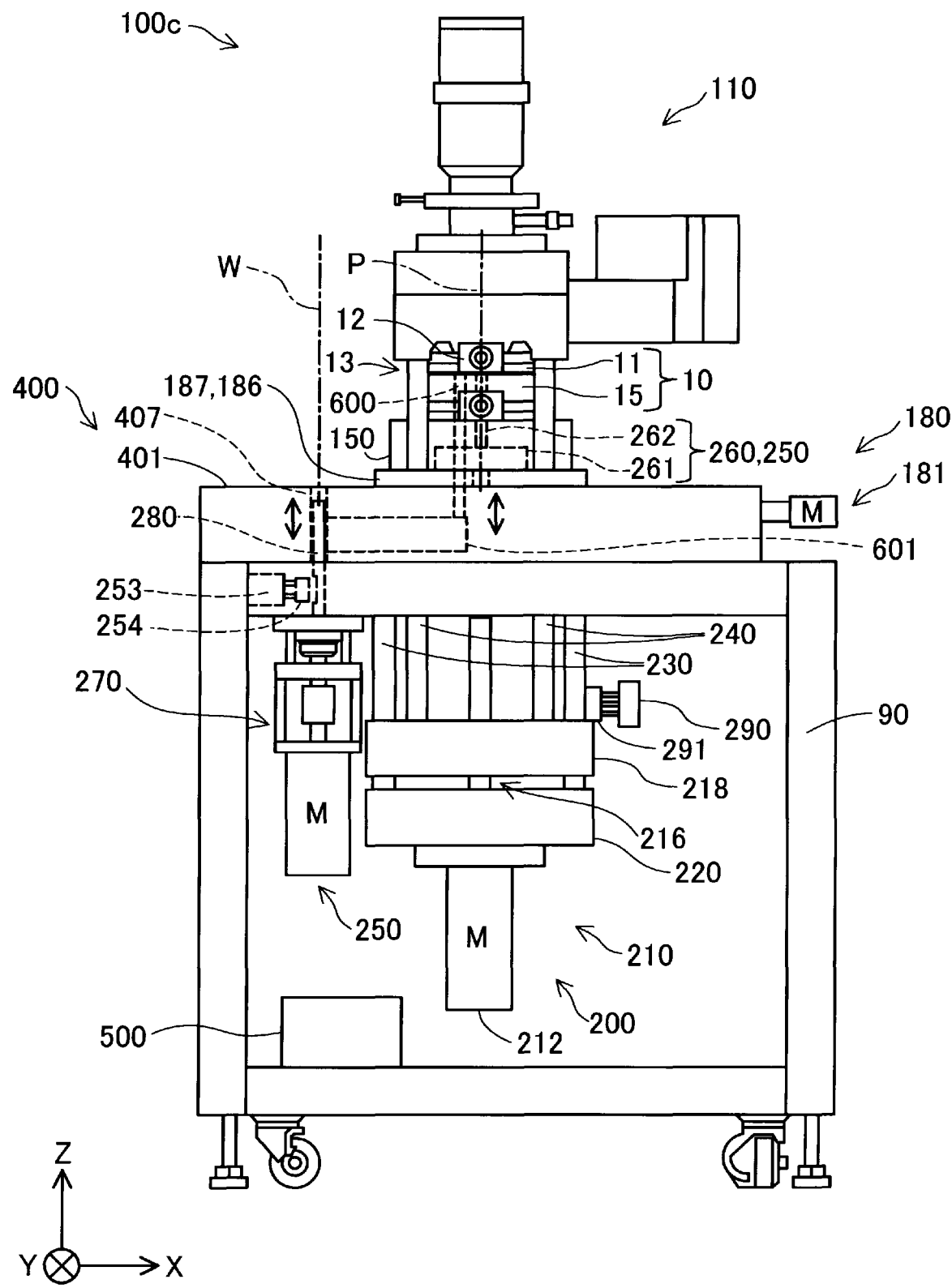
FIG. 16 is a diagram schematically showing schematic configuration of an injection molding machine according to a third embodiment.

FIG. 16 is a diagram schematically showing schematic configuration of an injection molding machine 100c according to a third embodiment. Similarly to the injection molding machine 100 according to the first embodiment, the injection molding machine 100c according to the third embodiment includes the ejector section 250. The injection molding machine 100c, according to the present embodiment, includes a movable pin 600 that is movable in the cavity of the die-casting mold 10 along the vertical direction. The movable pin 600 passes through the lower mold 15, the lower mold support section 150, and the movable section 186, and the lower end thereof is supported by the support arm 601. The support arm 601 is coupled to the contact section 280 of the ejector section 250. Therefore, the movable pin 600 can operate in conjunction with the operation of the ejector section 250. When the molded article is taken out from the lower mold 15 at the waiting position W, the movable pin 600 moves to a position not supported by the support arm 601. Therefore, when the molded article is taken out, the movable pin 600 is not interlocked with the operation of the ejector pin 262. Note that is also possible to interlock operation of the movable pin 600 with the operation of the ejector pin 262 at the time of taking out the molded article.

In the third embodiment, the actuator 291 of the first auxiliary brake 290 is provided and configured to contact the top surface of the movable plate 218. After or while the molding material is injected into the cavity, the control section 500 controls the ejector section 250 to move the movable pin 600 inside the cavity. At this time, the control section 500 drives the first auxiliary brake 290 to bring the actuator 291 into contact with the movable plate 218 so as not to open the die-casting mold 10, thereby regulating movement of the upper mold 11 supported by the movable plate 218 and the injection unit 110.

Figure 17:
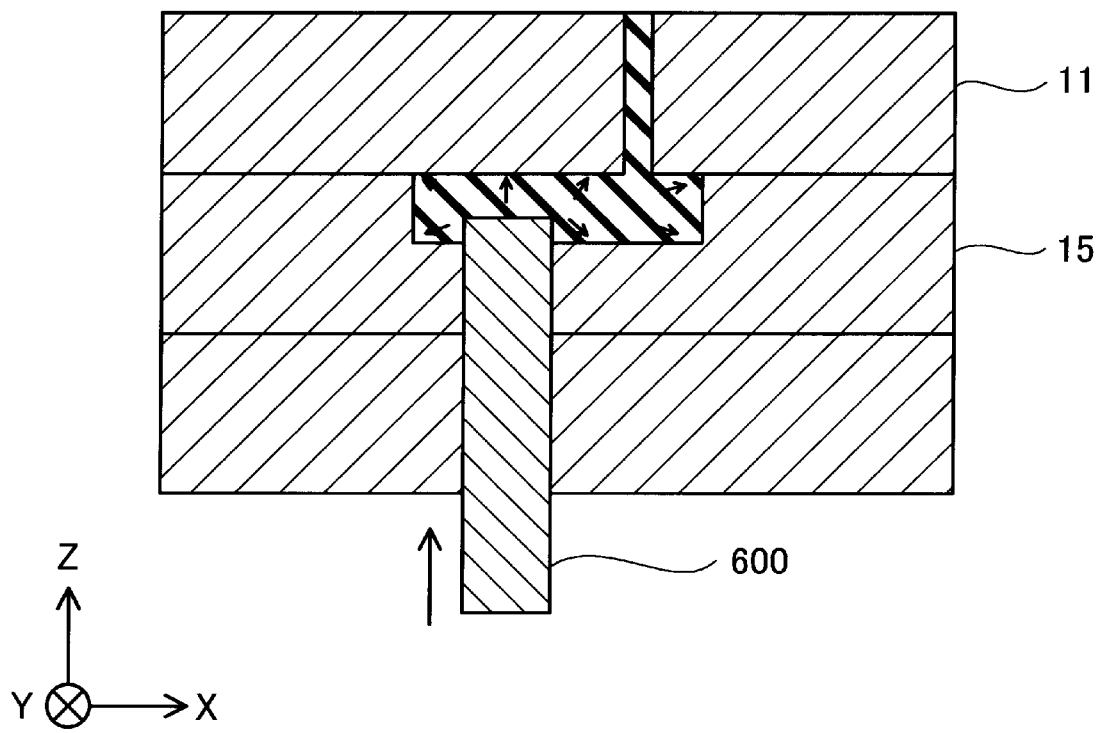
FIG. 17 is a diagram illustrating an operation of a movable pin in a cavity.

FIG. 17 is a diagram explaining the operation of the movable pin 600 inside the cavity. In the present embodiment, immediately after the molding material is injected into the cavity, the control section 500 controls the ejector section 250 to move the movable pin 600 upward so as to push the movable pin into the cavity. Thus, the control section 500 can increase the pressure in the cavity. Thereby, the filling rate of the molding material can be increased. In the present embodiment, since the control section 500 controls the first auxiliary brake 290 to regulate the upward movement of the upper mold 11, it is possible to suppress the opening of the die-casting mold 10 due to the pushing of the movable pin 600 into the cavity. Therefore, the filling rate of the molding material can be effectively improved. In addition to the first auxiliary brake 290 or instead of the first auxiliary brake 290, a first electromagnetic brake provided in the mold clamping motor 212 may be operated to regulate the upward movement of the upper mold 11.

Figure 18:
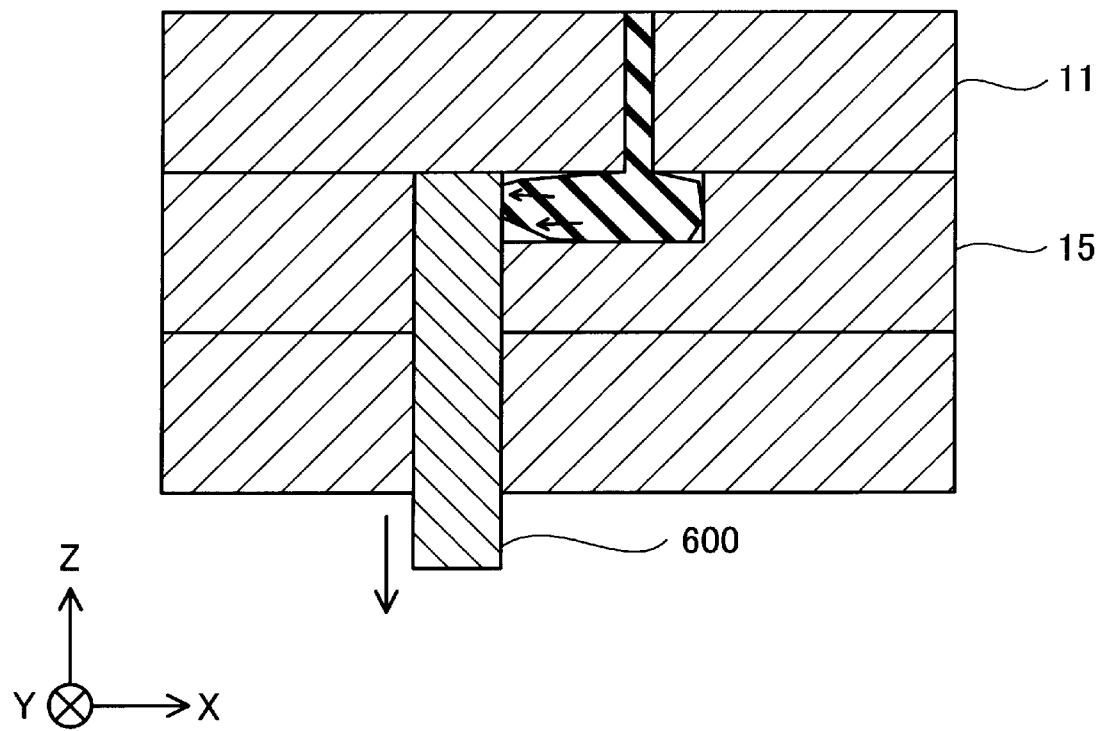
FIG. 18 is a diagram explaining a second example of the operation of the movable pin in the cavity.

FIG. 18 is a view for explaining a second example of the operation of the movable pin in the cavity. In the example shown in FIG. 18, while the molding material is injected into the cavity, the control section 500 controls the ejector section 250 to pull down the movable pin 600 inserted into the cavity in accordance with the filling state of the molding material in the cavity. In this way, the control section 500 can control the flow of the molding material in the cavity. Accordingly, for example, it is possible to adjust the position of the weld line or perform gas venting.

Additionally, the movable pin 600 is not limited to a mode in which it is moved in the cavity, and can be used for moving a slide core, for example.

Figure 19:
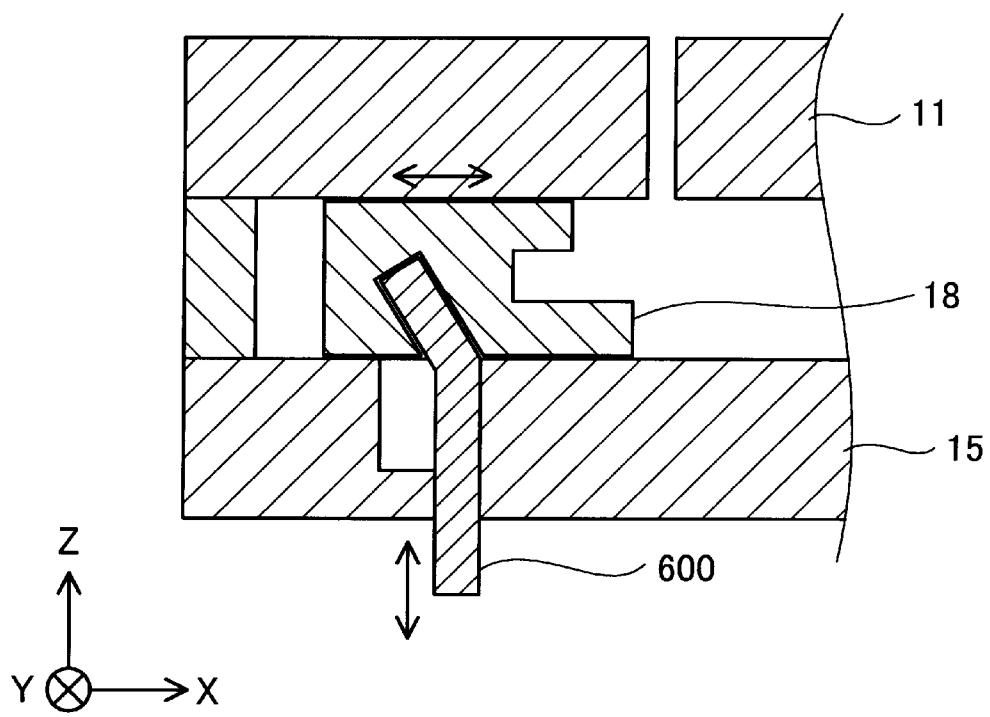
FIG. 19 is a diagram explaining the operation of the slide core using the movable pin.

FIG. 19 is a view for explaining the operation of a slide core 18 using the movable pin 600. The movable pin 600 shown in FIG. 19 is not moved in the cavity, but is used as an angular pin for sliding the slide core 18 in the horizontal direction. Therefore, the distal end of the movable pin 600 extends obliquely upward. In the example shown in FIG. 19, while the molding material is injected into the cavity, the control section 500 operates the second auxiliary brake 253 provided in the ejector section 250 to regulate the downward movement of the movable pin 600. Thus, the slide core 18 can be prevented from moving due to the pressure in the cavity during molding. In addition to the second auxiliary brake 253 or instead of the second auxiliary brake 253, a second electromagnetic brake provided in the ejector motor 274 may be operated to regulate the movable pin 600 from moving downward.

D. Other Embodiments (D1) In the above embodiment, the mold clamping device 200 performs mold clamping and mold opening by moving the injection unit 110 and the upper mold 11 along the vertical direction. In contrast, the mold clamping device 200 may perform mold clamping and mold opening by moving the lower mold 15 along the vertical direction. In this case, the first brake section regulates movement of the lower mold 15 in the vertical direction in a state in which application of voltage to the mold clamping motor 212 is stopped.

(D2) In the above embodiment, each of the mold clamping motor 212 and the ejector motor 274 includes an electromagnetic brake. On the other hand, these motors may not have an electromagnetic brake. When each of the mold clamping motor 212 and the ejector motor 274 includes an electromagnetic brake, the injection molding device 5 may not have the first auxiliary brake 290 and the second auxiliary brake 253. That is, the first brake section may be configured by at least one of the first electromagnetic brake or the first auxiliary brake 290. The second brake section may be configured by at least one of the second electromagnetic brake or the second auxiliary brake 253.

(D3) In the embodiment described above, the third brake section 350 is constituted by a friction brake. On the other hand, the third brake section 350 may be realized by an electromagnetic brake function provided in the screw motor 32. Further, the third brake section 350 may be realized by both the friction brake and the electromagnetic brake. That is, the third brake section 350 may be configured by at least one of the friction brake or the electromagnetic brake.

(D4) In the above embodiment, the injection molding device 5 includes a first brake section, a second brake section, and a third brake section 350. In contrast, the injection molding device 5 may include the first brake section and may not include the second brake section and the third brake section 350. The injection molding device 5 may include the first brake section and the second brake section, and may not include the third brake section 350. The injection molding device 5 may include the first brake section and the third brake section 350, and may not include the second brake section. In addition to these configurations, for example, the injection molding device 5 may include at least one of the second brake section or the third brake section 350, and may not include the first brake section.

(D5) In the above embodiment, the position change section 180 linearly moves the lower mold support section 150 along the X direction. In contrast, the position change section 180 may not linearly move the lower mold support section 150. For example, the position change section 180 may be configured by a so-called rotary table that moves the lower mold support section 150 such that movement trajectory of the lower mold support section 150 draws a circle when viewed along the vertical direction.

(D6) In the injection molding machine 100 of the above embodiment, the position of the lower mold 15 can be changed by the position change section 180. In contrast, the injection molding machine 100 may not include the position change section 180. In this case, the ejector section 250 is installed between the mold clamping device 200 and the lower mold support section 150 and ejects the molded article at the injection position P.

E. Other Forms

The present disclosure is not limited to the above described embodiments, and can be realized in various configurations without departing from the spirit thereof. For example, the technical features of the embodiments corresponding to the technical features in each aspect described below can be appropriately replaced or combined in order to solve a part or all of the problems described above or in order to achieve a part or all of the effects described above. In addition, unless the technical features are described as essential in the present specification, the technical features can be appropriately deleted.

(1) According to a first aspect of the present disclosure, an injection molding device is provided. The injection molding device includes a housing having a door, an injection molding machine stored in the housing, a detection section configured to detect whether the door is open or closed or to detect intrusion of foreign matter into the housing, and a control section. The injection molding machine has a support section for supporting a die-casting mold having an upper mold and a lower mold, an injection unit configured to inject a molding material toward a cavity defined by the upper mold and the lower mold, and a mold clamping device having a mold clamping motor that drives the die-casting mold, the injection unit, the upper mold, and the lower mold are disposed in this order in a vertical direction from above, while in a supported state in which the die-casting mold is supported by the support section. In the supported state, the control section controls voltage applied to the mold clamping motor, and performs mold-clamping and mold-opening of the upper mold and the lower mold by either moving the injection unit and the upper mold along the vertical direction or by moving the lower mold along the vertical direction. The mold clamping device further includes a first brake section that, when application of voltage to the mold clamping motor is stopped, regulates movement of the injection unit and the upper mold in the vertical direction or movement of the lower mold in the vertical direction. When the detection section detects that the door is open or detects intrusion of foreign matter, the control section stops application of voltage to the mold clamping motor.

According to this aspect, in a case where application of voltage to the mold clamping motor is stopped due to a factor such as the open or closed state of the door or detects the intrusion of foreign matter into the housing, movement of the upper mold or the lower mold in the vertical direction can be regulated by the first brake section.

(2) In the aspect described above, the detection section may include a light emitting section and a light receiving section. With such a configuration, it is possible to optically detect the intrusion of foreign matter.

(3) In the above embodiment, the injection molding device further includes an ejector section configured to remove a molded article from the lower mold, wherein the ejector section has an ejector pin and an ejector motor driving the ejector pin, the control section stops application of voltage to the ejector motor when the detection section detects that the door is open or detects intrusion of foreign matter, the ejector section may have a second brake section that regulates movement of the ejector pin in a state in which application of voltage to the ejector motor is stopped. According to this aspect, when application of voltage to the ejector motor is stopped due to a factor such as the open or closed state of the door or detects the intrusion of foreign matter into the housing, movement of the ejector pin can be regulated by the second brake section.

(4) In the above aspect, the injection unit may include a heating section configured to plasticize material to generate the molding material, and the heating section and the mold clamping motor may be coupled to different power supplies. In such a configuration, voltages can be applied to the heating section and the mold clamping motor individually. Therefore, for example, voltage can be applied to the heating section even while application of voltage to the mold clamping motor is stopped.

(5) In the above embodiment, the injection unit includes a plasticizing section that plasticizes material to generate the molding material, the plasticizing section includes a groove formed surface in which a groove is formed, a flat screw that rotates about a rotation shaft, a facing surface facing the groove formed surface, and a barrel in which a communication hole into which the molding material flows is formed, the flat screw has a length in a direction along the rotation axis shorter than a length in a direction perpendicular to the rotation axis, and the flat screw and the barrel may be arranged in this order in the vertical direction from above. With such a configuration, the injection molding device can be miniaturized.

(6) In the above embodiment, the injection unit includes a screw motor that rotates the flat screw, the control section stops application of voltage to the screw motor when the detection section detects that the door is open or detects intrusion of foreign matter, the injection unit may include a third brake section that regulates the rotation of the flat screw in a state in which application of voltage is stopped to the screw motor. According to this aspect, it is possible to suppress the flat screw from rotating due to inertia after application of voltage to the screw motor is stopped.

(7) In the above embodiment, the lower mold includes a first lower mold and a second lower mold, the support section includes a first support section supporting the first lower mold and a second support section supporting the second lower mold, and the injection molding device further includes a position change section configured to move the first support section and the second support section, wherein the position change section may switch the supported state between a first supported state in which the first lower mold is located at a position facing the upper mold and the second lower mold is located at a position not facing the upper mold and a second supported state in which the second lower mold is located at a position facing the upper mold and the first lower mold is located at a position not facing the upper mold. According to such an aspect, since a molded article can be molded using the first lower mold and the second lower mold, the manufacturing efficiency of the molded article can be enhanced.

(8) In the above embodiment, the injection molding device, further include a first ejector section configured to, in the first supported state, remove the molded article from the second lower mold and a second ejector section configured to, in the second supported state, eject the molded article from the first lower mold, wherein each of the first ejector section and the second ejector section has an ejector pin and an ejector motor for driving the ejector pin, the ejector motors of the first ejector section and the second ejector section may be located below the support section, the mold clamping motor may be located between the ejector motor of the first ejector section and the ejector motor of the second ejector section. With this configuration, the first ejector section, the second ejector section, and the mold clamping motor can be efficiently arranged.

(9) In the above configuration, the injection molding device includes an ejector section, having an ejector pin for removing a molded article from the lower mold, and a movable pin movable in the cavity, wherein the movable pin operates in conjunction with an operation of the ejector section, and after or while the molding material is injected into the cavity, the control section may control the ejector section to move the movable pin in the cavity. According to this aspect, by moving the movable pin in the cavity, it is possible to increase the pressure in the cavity or control the flow of the molding material in the cavity.

What is claimed is:

1. An injection molding device comprising:
a housing including a door;
an injection molding machine stored in the housing;
a detection section configured to detect whether the door is open or closed or to detect intrusion of foreign matter into the housing; and
a control section, wherein
the injection molding machine includes
a support section for supporting a die-casting mold having an upper mold and a lower mold,
an injection unit configured to inject a molding material toward a cavity defined by the upper mold and the lower mold, and
a mold clamping device including a mold clamping motor that drives the die-casting mold,
the injection unit, the upper mold, and the lower mold are disposed in this order in a vertical direction from above, while in a supported state in which the die-casting mold is supported by the support section, in the supported state, the control section controls voltage applied to the mold clamping motor and performs mold-clamping and mold-opening of the upper mold and the lower mold by either moving the injection unit and the upper mold along the vertical direction or by moving the lower mold along the vertical direction, the mold clamping device further includes a first brake section that, when application of voltage to the mold clamping motor is stopped, regulates movement of the injection unit and the upper mold in the vertical direction or movement of the lower mold in the vertical direction, and when the detection section detects that the door is open or detects intrusion of foreign matter, the control section stops application of voltage to the mold clamping motor.

2. The injection molding device, according to claim 1, wherein the detection section has a light emitting section and a light receiving section.

3. The injection molding device, according to claim 1, further comprising:

an ejector section configured to remove a molded article from the lower mold, wherein the ejector section includes an ejector pin and an ejector motor driving the ejector pin, the control section stops application of voltage to the ejector motor when the detection section detects that the door is open or detects intrusion of foreign matter, the ejector section includes a second brake section that regulates movement of the ejector pin in a state in which application of voltage to the ejector motor is stopped.

4. The injection molding device, according to claim 1, wherein the injection unit includes a heating section configured to plasticize material to generate the molding material, and the heating section and the mold clamping motor are coupled to different power supplies.

5. The injection molding device, according to claim 1, wherein the injection unit includes a plasticizing section that plasticizes material to generate the molding material, the plasticizing section includes
a groove formed surface in which a groove is formed,
a flat screw that rotates about a rotation shaft,
a facing surface facing the groove formed surface, and
a barrel in which a communication hole into which the molding material flows is formed, the flat screw has a length in a direction along the rotation axis shorter than a length in a direction perpendicular to the rotation axis, and the flat screw and the barrel are arranged in this order in the vertical direction from above.

6. The injection molding device, according to claim 5, wherein the injection unit includes a screw motor that rotates the flat screw, the control section stops application of voltage to the screw motor when the detection section detects that the door is open or detects intrusion of foreign matter, and the injection unit includes a third brake section that regulates the rotation of the flat screw in a state in which application of voltage is stopped to the screw motor.

7. The injection molding device, according to claim 1, wherein the lower mold includes a first lower mold and a second lower mold, the support section includes a first support section supporting the first lower mold and a second support section supporting the second lower mold, and the injection molding device further includes a position change section configured to move the first support section and the second support section, wherein the position change section switches the supported state between
a first supported state in which the first lower mold is located at a position facing the upper mold and the second lower mold is located at a position not facing the upper mold and
a second supported state in which the second lower mold is located at a position facing the upper mold and the first lower mold is located at a position not facing the upper mold.

8. The injection molding device, according to claim 7, further comprising:

a first ejector section configured to, in the first supported state, remove the molded article from the second lower mold and a second ejector section configured to, in the second supported state, eject the molded article from the first lower mold, wherein each of the first ejector section and the second ejector section has an ejector pin and an ejector motor for driving the ejector pin, the ejector motors of the first ejector section and the second ejector section are located below the support section, and the mold clamping motor is located between the ejector motor of the first ejector section and the ejector motor of the second ejector section.

9. The injection molding device, according to claim 1, further comprising:

an ejector section having an ejector pin for removing a molded article from the lower mold and a movable pin movable in the cavity, wherein the movable pin operates in conjunction with an operation of the ejector section, and after or while the molding material is injected into the cavity, the control section controls the ejector section to move the movable pin in the cavity.

* * * * *